US010322833B2

(12) United States Patent
Hutter et al.

(10) Patent No.: US 10,322,833 B2
(45) Date of Patent: Jun. 18, 2019

(54) APPARATUS AND METHOD FOR HANDLING ARTICLES

(71) Applicant: KRONES Aktiengesellschaft, Neutraubling (DE)

(72) Inventors: Alban Hutter, Reit im Winkl (DE); Wolfgang Fechter, Rosenheim (DE); Roland Hofstetter, Rott am Inn (DE)

(73) Assignee: Krones Aktiengesellschaft, Neutraubling (DE)

( * ) Notice: Subject to any disclaimer, the term of this patent is extended or adjusted under 35 U.S.C. 154(b) by 647 days.

(21) Appl. No.: 14/886,269

(22) Filed: Oct. 19, 2015

(65) Prior Publication Data

US 2016/0137326 A1    May 19, 2016

(30) Foreign Application Priority Data

Oct. 20, 2014   (DE) .................. 10 2014 221 233

(51) Int. Cl.
  *B65B 35/36*   (2006.01)
  *B65B 57/14*   (2006.01)
  (Continued)

(52) U.S. Cl.
  CPC .............. *B65B 35/36* (2013.01); *B65B 5/08* (2013.01); *B65B 21/18* (2013.01); *B65B 21/20* (2013.01);
  (Continued)

(58) Field of Classification Search
  CPC .... B65G 47/907; B65G 47/905; B65B 57/14; B65B 35/36; B65B 35/30; B65B 5/08; B65B 21/18
  (Continued)

(56) References Cited

U.S. PATENT DOCUMENTS 3,780,492 A * 12/1973 Corderoy .............. B65B 21/183
                                                          294/87.1
4,215,967 A   8/1980 McGill et al.
(Continued)

FOREIGN PATENT DOCUMENTS

CH           693710         12/2003
CN          1597453          3/2005
(Continued)

OTHER PUBLICATIONS

Patent Application in China—Office Action dated Jul. 27, 2017.
(Continued)

*Primary Examiner* — Robert F Long
*Assistant Examiner* — Xavier A Madison
(74) *Attorney, Agent, or Firm* — Simmons Perrine Moyer Bergman PLC

(57) ABSTRACT

The method of the present invention removes at least a plurality of articles (02) arriving consecutively in a transport direction (FR) from an infeed (03), and subsequently, arranging and grouping the articles (02), while simultaneously lifting and collectively transferring the article (02) from the infeed (03) to a staging surface (04). At the staging area are one or more outer packagings (05), and into which the articles (02) are placed. Individually or groupwise, as seen in a direction in parallel to the transport direction (FR), the individual distances between the articles (02) corresponding to a defined arrangement (20) are increased and/or decreased, and finally, the articles (02) are simultaneously lowered and released into the one or a plurality of outer packagings (05). The apparatus of the present invention comprises an infeed (03) of articles (02) being transported, at least one staging surface (04) arranged next to the infeed (03). On the staging surface (04), outer packagings (05) are staged, and which will be filled with articles (02) removed (Continued)

from the infeed (03). From the staging surface (04), the filled outer packagings (05) are discharged. A gripping device (07) is used to simultaneously seize a plurality of articles (02) from the infeed (03). The gripping device (07) has one gripper head (70) per article. The gripping device (07) has at least one manipulator (71) with a horizontally and vertically movable manipulator head (72).

19 Claims, 14 Drawing Sheets

(51) Int. Cl.
*B65G 47/90* (2006.01)
*B65B 21/18* (2006.01)
*B65B 21/20* (2006.01)
*B65B 5/08* (2006.01)

(52) U.S. Cl.
CPC .......... *B65B 57/14* (2013.01); *B65G 47/905* (2013.01); *B65G 47/907* (2013.01)

(58) Field of Classification Search
USPC .......................................................... 53/448
See application file for complete search history.

(56) References Cited

U.S. PATENT DOCUMENTS

| | | | |
|---|---|---|---|
| 4,901,504 A | 2/1990 | Tsuji et al. | |
| 5,060,455 A * | 10/1991 | Schmeisser | B65B 21/18 53/247 |
| 5,375,395 A | 12/1994 | Gmeiner | |
| 5,456,563 A | 10/1995 | Hansjorg | |
| 5,553,442 A | 9/1996 | Fadaire | |
| 5,611,193 A * | 3/1997 | Farrelly | B65B 5/105 53/245 |
| 6,374,984 B1 | 4/2002 | Nagler | |
| 6,941,723 B2 * | 9/2005 | Di Stasio | B65B 21/18 53/247 |
| 7,390,040 B2 * | 6/2008 | Subotincic | B25J 15/0052 198/468.3 |
| 7,552,570 B2 | 6/2009 | Raudat et al. | |
| 8,286,409 B2 | 10/2012 | Junghans | |
| 9,546,049 B2 | 1/2017 | Lindauer | |
| 9,637,256 B2 | 5/2017 | Wickeren et al. | |
| 2005/0226711 A1 | 10/2005 | Schnoor et al. | |
| 2011/0173930 A1 | 7/2011 | Poutot | |
| 2013/0283731 A1 | 10/2013 | Komp | |
| 2013/0298500 A1 * | 11/2013 | Laudet | B65B 5/06 53/284.5 |
| 2015/0098782 A1 | 4/2015 | Lindauer | |

FOREIGN PATENT DOCUMENTS

| | | |
|---|---|---|
| DE | 202004021892 | 7/2012 |
| DE | 202014000884 U1 | 5/2014 |
| EP | 1254854 A1 | 11/2002 |
| EP | 2233400 | 9/2010 |
| GB | 715134 A | 9/1954 |
| GB | 999282 A | 7/1965 |
| GB | 1462677 | 1/1977 |
| WO | 2013010697 A1 | 1/2013 |
| WO | 2014072518 A2 | 5/2014 |

OTHER PUBLICATIONS

German Patent Application Search Report—DE 10 2014 221 233.2—dated Jul. 20, 2015.
European Patent Application 15189611.5-1708—Office Action dated Mar. 10, 2017.
European Application No. EP 15 18 9611—Extended European Search Report dated May 19, 2016.
European Patent Application Partial Search Report—EP 15 18 9611—dated Feb. 8, 2016.
EPO Notice of Opposition by KHS GmbH dated Oct. 24, 2018 and Attachment.
EPO Notice of Opposition by Gerhard Schubert GmbH filed Oct. 22, 2018.
Response to EPO Opposition by Gerhard Schubert GmbH filed Jan. 30, 2019.

* cited by examiner

APPARATUS AND METHOD FOR HANDLING ARTICLES

PRIORITY CLAIM

This application claims the benefit of German Application DE 10 2014 221 233.2, filed on Oct. 20, 2014, which is incorporated by reference.

FIELD OF THE INVENTION

The present invention relates to an apparatus for handling articles and to a method for handling articles.

BACKGROUND OF THE INVENTION

The handling of articles frequently involves providing individual or a plurality of articles with an outer packaging.

In the case of individual articles, this is carried out for their improved protection and/or for their improved sales presentation.

In the case of a plurality of articles, a bundle of a plurality of articles is additionally achieved by the outer packaging.

Bundles represent an effective way of enabling simultaneous handling of a plurality of articles, for instance, for facilitating the transport of a plurality of articles at the same time. For many articles, such as beverage containers, for example, bundles of a plurality of articles held together thus represent the most frequent type of sales units.

The articles can be, for instance, objects, such as, for example, packaged or unpackaged objects, containers, such as beverage bottles or cans, or in themselves bundles, in turn, of a plurality of objects, in which the objects of a bundle can be held together, for instance, by means of an embracing around the periphery of a group of objects, such as, for instance, a strapping, a wrapping, a shrink tube, or an outer packaging, such as a cardboard packaging or a carrying rack, for instance, a beverage crate, to name but a few conceivable embodiments.

For instance, cardboard boxes or beverage crates, to name but a few conceivable embodiments, are used as outer packaging respectively accommodating one or more articles, because they offer a high, and, as the case may be, additional protection for the articles accommodated therein, because they are in addition stackable together with the articles accommodated therein, and because they moreover enable identifying the articles accommodated therein by means of information printed or glued onto their outside. They can further serve as advertising media by the corresponding information on their outside.

Outer packaging can be designed with or without compartments, also termed so-called baskets, arranged or arrangeable therein for separating and/or keeping apart individual articles from each other.

So-called interior fittings to be arranged or being arranged in an outer packaging, which interior fittings can consist, for instance, of dividers slotted into each other and/or connected with each other, for instance, by bending edges and/or adhesive joints, are termed compartments.

The dividers can consist of cardboard and/or paperboard or plastics, for instance. For instance, corrugated cardboard can be used for the dividers to protect sensitive articles. The dividers are connected with each other such that compartments are produced with, for example, a rectangular or a triangular or a polyangular base, provided for respectively one or more articles, which are fastened against shifting in the compartments.

To summarize, compartments assign fixed positions to the articles within the outer packaging and thus protect them, during the further transport and/or during the storage of the outer packaging accommodating these articles until the articles are withdrawn and consumed, for instance, from colliding with each other and rubbing against each other, which otherwise would lead to a negative impression of the quality by scuffing, for instance, of information applied onto the articles in the form of labels, for example, and/or by the articles damaging each other.

So-called blind compartments or blind cells can be realized at the outer edge of a set of compartments, which can be formed, for example, to be too small for the reception of articles. Blind compartments or blind cells at the periphery of a set of compartments inserted into an outer packaging or arranged in an outer packaging afford a further protection of articles accommodated in the outer packaging, for example in the instance of mechanical stress and/or deformation of article-accommodating outer packaging.

In handling articles, for instance, in food technology and/or beverage technology and/or packaging technology and/or in the food industry and/or beverage industry and/or packaging industry, pacing, i.e. being able to handle as many articles as possible within an as short as possible time span, represents a significant cost factor. The faster the pacing, the higher is the article throughput, and the better is thus the utilization of the machines, facilities, and devices intended for this purpose. Pacing can thus be described as the ratio of the number of articles to the period of time within which this number of articles is handled.

In order to be able to achieve high pacings, fully automatic devices, also called transplacing machines or, termed for short transplacers, are used in the packaging technology and in the packaging industry for transferring articles, which transplacers, in connection with the staging of outer packaging, continuously or discontinuously remove the article or the articles respectively to be transferred into an outer packaging within fractions of seconds from an infeed of articles being transported by means of, for instance, one or more conveyors in, for instance, one or more article flows of continuous, immediately consecutive articles or articles that are already grouped according to their number and/or already spaced apart from one another according to their later arrangement in the outer packaging, and transfer them into the outer packaging.

In order to further increase the achievable pacing, the aim is to provide as many articles simultaneously as possible with outer packaging. For this purpose, as many articles as can be simultaneously placed into supplied outer packaging are taken simultaneously from one or more article flows.

A transplacer has a gripping device, for this purpose, with a so-called gripper head, termed gripper for short, per article to be simultaneously transferred into an outer packaging. The gripper head, coming from above, seizes an article with a gripping force at least sufficient to lift the article. In this context, each article to be seized from the infeed must be seized as precisely as possible in order to exclude disturbances in the seizing and standstill periods resulting therefrom.

It is obvious that such transplacers are highly complex and thus expensive, making standstill periods, for instance, due to a change of the format of outer packaging and/or articles particularly excruciating.

In addition, the space requirement for the construction of the equipment technology is another not insubstantial cost factor in handling articles. The greatest cost factor in this context is the required floor space, because most of the facilities do not fully use the ceiling height commonly available in production halls.

One object in developing apparatuses for handling articles comprising at least one or more transplacers as well as methods carried out in transferring articles into one or more outer packagings corresponding to the apparatuses, is therefore to keep standstill periods as short as possible, without, however, negatively affecting the pacing.

An apparatus for supplying articles to a continuously operating packaging machine is known from DE 42 04 993. The apparatus comprises a plurality of gripping heads, which are respectively hinged rotationally driven to a lever. A conveyor belt guides articles in direction toward the respective gripping heads. The articles in this instance are arranged in rows, are brought to a halt by a stop means at the end of the conveyor belt, and are received by one of the gripping heads. After the reception, the stop means is lowered. Further articles advance, while the already received articles are placed into corresponding crates via the gripper head and subsequently discharged. The further articles, which have advanced in the meantime, can be received by a further gripping head and disposed in a further, following crate.

It has been shown for such apparatuses as are known from the prior art that the expected desired position not always coincides with the effective actual position when the respective articles are being received from the conveyor belt. This can particularly be the case if the respective articles are containers designed as PET bottles, for instance, which tend to dimensional instability. Inaccuracies in transferring the respective articles onto the conveyor belt can also occur so that the effective actual position of the articles is only approximately known.

If deviations from the expected desired position occur, the respective gripping devices for receiving the respective articles can collide with the articles and the articles can thus not be received by the gripping devices. This can result in damages to the respective gripping device. In order to correct this error, an interruption of the process can also be necessary, thus leading to delays in the article production and to a lower throughput along with a dramatic decrease of the pacing as seen over a longer period of time.

SUMMARY OF THE INVENTION

One task of the invention is to specify an apparatus and a device for the particularly efficient handling of articles, which handling provides to continuously or discontinuously remove a plurality of articles simultaneously from at least one infeed of articles being transported by means of, for instance, one or more conveyors, in, for instance, one or more article flows of continuous, immediately consecutive articles or articles that are already grouped according to their number and/or already spaced apart from one another according to their later arrangement in the outer packaging, and transfer them into at least one outer packaging.

The above task is solved respectively by the features of the independent claims. Further advantageous embodiments of the invention are described in the dependent claims.

A first object of the invention accordingly relates to a device for handling articles, which handling provides to continuously or discontinuously remove a plurality of articles simultaneously from an infeed of articles being transported in a transport direction by means of, for instance, one or more conveyors, in, for instance, one or more article flows of continuous, immediately consecutive articles and/or articles that are spaced apart from one another, for instance, already grouped according to their number and/or already spaced apart from one another according to their later arrangement in an outer packaging, and transfer them into at least one outer packaging staged on a staging surface.

The apparatus comprises an infeed of, for instance, articles being transported continuously or discontinuously in a transport direction in one or more article flows of continuous, immediately consecutive articles or articles that are already grouped according to their number and/or already spaced apart from one another according to their later arrangement in the outer packaging.

The infeed can comprise, for instance, at least one conveyor, for example in the form of one or more horizontal conveyors, on which the articles are transported continuously or discontinuously in a transport direction in one or more article flows, separated from each other, for instance, by lane separators, of continuous, immediately consecutive articles or articles that are already grouped according to their number and/or already spaced apart from one another according to their later arrangement in the outer packaging.

Arranged next to the infeed as seen in the direction of a horizontal axis, the apparatus moreover comprises at least one staging surface, on which outer packagings have been and/or are being staged, which outer packagings are to be filled with articles having been removed from the infeed, and from which staging surface the outer packagings are discharged after the articles have been placed therein. The outer packagings can be closed on the spot before being discharged, for instance, by means of lids or by folding shut and closing of flaps, for instance, which can be formed by cardboard packaging walls, which are connected with the outer packagings by bending edges.

The staging surface can comprise at least one conveyor, for instance, in the form of one or more horizontal conveyors, on which the outer packagings are staged.

By means of at least one conveyor comprised by the staging surface, the outer packagings can be discharged in a discharge direction after the articles have been placed therein. In this context, the discharge direction can run in parallel to the transport direction of the infeed in the same direction or in the opposite direction of the infeed.

Alternatively or additionally, by means of the at least one conveyor comprised by the staging surface, the outer packagings can be supplied in an infeed transport direction prior to placing the articles therein.

Alternatively, the staging surface can be arranged next to an infeed conveyor and/or to a discharge conveyor or between an infeed conveyor and a discharge conveyor, with the outer packagings being pushed over for their staging on the staging surface, for instance, transversely to an infeed transport direction, onto the staging surface and/or with the outer packagings, after the articles have been placed therein on the staging surface, being pushed over for their discharge, for instance, transversely to a discharge direction, from the staging surface onto a discharge conveyor.

The discharge direction and/or the infeed transport direction preferentially runs in parallel to the transport direction of the infeed.

Preferentially, the staging surface is positioned in parallel to the infeed and to its transport direction—as the case may be, spaced apart, as seen transversely to the infeed transport direction and/or discharge direction, by the width of an infeed conveyor and/or of a discharge conveyor.

The apparatus additionally comprises a gripping device for simultaneously seizing a plurality of articles from the infeed, which gripping device has one gripper head per article, for instance, tulip-shaped grippers or one or more gripper fingers, or the like, which gripper head is lowerable coming from above onto an article in the infeed.

In order to be able to horizontally move the gripper heads of the gripping device between the infeed and one or more outer packagings staged on the staging surface, and also to move them vertically in space for the purpose of lifting the simultaneously seized articles from the infeed as well as lowering the simultaneously seized articles into the one or more outer packagings staged on the staging surface, the gripping device moreover has at least one manipulator with at least one manipulator head being horizontally movable along the horizontal axis and also vertically movable along a vertical axis, at which manipulator head the gripper heads of the gripping device are arranged.

The at least one manipulator can be, for instance, a multi-axis robot arm, for example with six axes, or a gantry or a tripod or quadropod, which is laterally movable back and forth along a horizontal axis as well as, preferably, also being liftable and lowerable along a vertical axis, to name but a few conceivable manipulators.

The gripper heads can be arranged at the manipulator head to be collectively translationally movably driven in a first horizontal direction in parallel to the transport direction of the infeed. Particularly preferentially, this first direction runs transversely, for instance, orthogonal, to the horizontal axis. In this way, the gripper heads can be lowered onto the articles arriving successively in the infeed and can be moved along with them even while articles of the infeed are still closing a gap resulting from a previous removal of articles from the infeed, such that, already as soon as the transported article or articles arriving foremost in the infeed reach a foremost removal position, as seen opposite to the transport direction, these and following articles can already be seized and, as the case may be, already removed from the infeed. In this way, a particularly high pacing can be achieved.

Alternatively or additionally, the entire manipulator head together with the gripper heads arranged thereat can be movable in the transport direction of the infeed for this purpose.

No matter whether the gripper heads are arranged at the manipulator head to be collectively translationally movably driven in a first horizontal direction in parallel to the transport direction of the infeed or not, according to the invention, the gripper heads are arranged at the manipulator head to be at least individually and/or groupwise, relative to each other, translationally movably driven in the first horizontal direction in parallel to the transport direction of the infeed. Particularly preferentially, this first direction runs transversely, for instance, orthogonal, to the horizontal axis.

In this way, a plurality of articles arriving, for instance, closely one after the other as seen in direction of the transport direction in one or more rows positioned in parallel transversely to the transport direction, can be simultaneously removed from the infeed, and be divided up and into a plurality of outer packagings staged on the staging surface spaced apart from each other, for instance, in a direction in parallel to the transport direction, and be simultaneously placed into them. Thus, the distance between a plurality of articles being simultaneously removed from the infeed can at least be changed, whereby these articles, while being transferred, can in turn be divided up, for instance, into groups to be respectively placed into one outer packaging each, and be simultaneously placed into the outer packagings staged on the staging surface.

In connection with a detection of the actual positions of the articles of the infeed arriving closely one after the other in transport direction, this furthermore results in the possibility to align the removal positions of the gripper heads with these actual positions, thus preventing errors in the detection of individual articles from the infeed. Such errors can, for instance, be caused by articles, which are deformed by the pressure of following articles in the infeed. Since most of the articles are seized in the area of the center of mass of their cover surface for their removal from the infeed—in the instance of articles formed as beverage bottles, this is where the bottle neck and the closing cap are located—a deformation with the simultaneous removal of a plurality of consecutive articles, for instance, six, twelve, eighteen, or more, as seen in the transport direction of the infeed, can result in a substantial misalignment of the required removal position of an article to be seized further behind, as seen opposite to the transport direction of the infeed, in relation to a foremost removal position. The removal positions, which the gripper heads take up for seizing the individual articles from the infeed, can be adapted to the actual positions of the articles in the infeed by the possibility of translational movements of the gripper heads in relation to each other in parallel to the transport direction.

In order to be able to adapt the removal positions of the gripper heads at the manipulator head to the actual positions of the articles in the infeed, the apparatus preferably comprises detection means for the actual positions of the articles based on a foremost removal position at the end of the infeed as seen opposite to the transport direction of the infeed. Such detection means can comprise one or more imaging sensors, such as, for instance, one or more video cameras or photo cameras, as well as a control unit carrying out an image recognition algorithm, which control unit analyzes in real time an image of the infeed provided by the at least one imaging sensor with regard to the actual positions of the successively, as seen from the end of the infeed opposite the transport direction of the infeed, consecutively arriving and/or accumulated articles, and produces control signals therefrom, which cause individual, translational movements in a direction in parallel to the transport direction of the individual gripper heads at the manipulator head in order to adapt the removal positions of the gripper heads to the actual positions of the articles in the infeed.

The gripper heads can additionally be arranged at the manipulator head to be movably driven relative to each other in a second horizontal direction orthogonal to the transport direction of the infeed. Preferentially, this second horizontal direction runs orthogonal to the first horizontal direction.

In this way, a plurality of articles arriving next to each other, for instance, in a plurality of rows positioned in parallel transversely to the transport direction, can be simultaneously removed from the infeed and divided up and into a plurality of outer packagings staged on the staging surface spaced apart from each other, for instance, in a direction in transversal to the transport direction, and be simultaneously placed into them. Generally, it is also possible in this way to simultaneously remove a plurality of articles arriving in only one row from the infeed and divide them up and into a plurality of outer packagings staged on the staging surface spaced apart from each other, for instance, whereby, while the articles having been removed from the infeed are lifted up, the articles can be grouped to one or more arrangements in, for instance, right angularly and/or diagonally arranged rows and lines, and subsequently the groups of articles thus acquired can be simultaneously placed into the outer packagings staged on the staging surface.

Furthermore, the possibility of the translational movement of the gripper heads orthogonal to the transport direction of the infeed results in the possibility of an adaptation to different article dimensions as seen in a direction transversal to the transport direction, when the articles arrive in a plurality of parallel article flows separated from each other by parallel lane separators.

By means of gripper heads arranged at the manipulator head to be individually translationally movably driven in respectively two independent horizontal directions in connection with detection means for the actual positions of the articles both in a direction in parallel as well as transversely to the transport direction, the apparatus is moreover able to remove articles from an infeed consisting of a disorderly mass flow of articles arriving disorderly and closely next to each other both longitudinally and transversely to the transport direction.

An advantageous embodiment of the invention provides that the gripper heads are arranged at the manipulator head to be rotationally movably driven respectively individually and thus relative to each other about rotational axes running in parallel to the vertical axis.

In this way, the articles can be aligned, for instance, all identically or toward the periphery of the outer packaging during the transferring into outer packagings such that, for instance, information applied onto the articles is readable from the outside when the articles have been placed into the outer packagings, or such that all articles are aligned in the same direction, for instance, when the outer packaging forms a sales unit, for instance, a display, or can be used as such. This increases the impression of the quality of outer packagings having been provided with articles by the apparatus according to the invention.

Each article has a base serving as contact surface of the article, a cover surface spaced apart from the base by one height of the article extending along a vertical axis standing normal upon the base, as well as a lateral surface connecting the circumference of the base with the circumference of the cover surface.

As mentioned, each article has a base serving as contact surface of the article, which base can be, for instance, circular or oval or regularly or irregularly triangular, rectangular, or polygonal, a cover surface spaced apart from the base by the height of the article extending normal to the base, which cover surface is, for instance, similar or congruent in the mathematical and/or geometrical sense to the base, as well as a lateral surface connecting the circumference of the base with the circumference of the cover surface. Extending from the center of mass of the base to the center of mass of the cover surface is a central axis, along which the centers of mass of all consecutive cross-section surfaces of the article situated in parallel to the base are located.

A central axis in this case can be defined, for instance, as a continuous or discontinuous mathematical curve, on which the centers of mass of all consecutive cross-section surfaces of the article are located. A result of this potential discontinuity is the possibility that the article has different central axes in consecutive sections or areas, and therefore, whenever a central axis is mentioned in the following text, this can refer to at least one central axis.

The result for an article is an essentially cylindrical form, which can, however, have changing geometries of the consecutive cross-section surfaces situated in parallel to the base along the height of the article, corresponding to a cone, a truncated cone, or a combination of cylinder and/or cone and/or truncated cone, for example. The cross-section surfaces can also be arranged similar to an oblique cylinder to be at least sectionwise offset to each other along the height of the article in a direction in parallel to the base. Generally, any forms of an article are conceivable, for instance, organic forms, whether as a part of or for the entire external form.

If the article has the form of a rotation body the central axis of which stands normal upon the base, the central axis corresponds to the vertical axis. An example of this is a straight cylinder, or a bottle form.

Base and cover surface can be arranged in parallel but also obliquely to each other, as is known, for instance, from articles designed as beverage containers in the form of a beverage carton.

If the article is designed as a container, such as a beverage container in the form of a bottle, the entire cover surface can be taken up by an opening being closable by means of a lid.

One or more articles can be designed to be tapered above and/or below at least one body of information.

If the articles in the infeed are being transported standing upright on their contact surfaces, the rotational axes running in parallel to the vertical axis, about which rotational axes the gripper heads are respectively individually arranged at the manipulator head rotationally movably driven, also run in parallel to the vertical axes of the articles.

By way of the gripper heads of the gripping device being arranged at the manipulator head to be individually rotationally movable about the rotational axes running in parallel to the vertical axis, the articles can be aligned respectively individually by turning about their vertical axis, for instance, by aligning information applied onto the individual articles about the article and/or its contents in a similar manner and/or directed to be generally visible to the outside.

The information can be, for instance, design elements and/or graphic designs and/or a brand name and/or a trademark and/or a specification of ingredients and/or of nutrients and/or of a best before date and/or of handling instructions and/or of hazard information and/or of storage instructions and/or of processing instructions and/or of instructions for use and/or address information, such as, for instance, of the producing and/or packaging company and/or of a commercial establishment, to point out but a few conceivable types of information.

A first known possibility to provide articles with information is by applying information media, typically at least partly glued-on, onto the lateral surface. A typical example of a corresponding information medium is a label, a banderole. An example that is not very widespread yet in connection with articles in the food and beverage industry, optionally in combination with a label, is a glued-on, so-called RFID tag, which comprises a transponder with an antenna, a transceiver consisting of an analog circuit for receiving and sending, as well as a digital circuit, and at least one permanent write-once, multiply readable memory.

Colloquially also called "smart labels", RFID (radio-frequency identification) represents a technology for sender-receiver systems for the automatic and contactless identification and locating of articles by means of radio waves. It substantially facilitates data detection.

An RFID system consists of an RFID tag, which is situated at or in the article and the memory of which contains at least one identification code, as well as a reading device for reading out this identification.

This coupling takes place by short range alternating electromagnetic fields generated by the reading device or by high frequency radio waves. Not only are data transmitted, but the RFID tag is also supplied with power in this way.

Information can be stored directly readable in the memory of the RFID tag, or it can be stored on at least one server and/or in at least one database and be identifiable and thus assigned to at least one article by means of the code stored in the memory of the RFID tag.

A rotational alignment of the articles while they are being transferred into outer packagings allows a uniform, reliable reading-out of such RFID tags, for instance in the passage of an outer packaging provided with articles in its further handling, such as, for instance, the transport to a stacking station, where a plurality of similar outer packagings or different outer packagings filled with similar or different articles are stacked up to form a stack, for instance, by the filled outer packagings first being grouped into packing layers respectively forming one stack layer in the finished stack and the packing layers subsequently being set down onto a stack so far having been built up at the stacking station.

A second known possibility of providing articles with information is so-called direct printing. In this context, the information is applied directly to the lateral surface by means of single- or multi-color printing. This can be the same information as can be visibly provided on one or more information media.

In dependence on whether the information is applied by way of single- or multi-print, one or more printing matters are applied onto the surface of an article in one or more printing processes for direct printing.

A special variant here, again, are RFID tags, which can also be produced by way of direct printing in a special printing process by printing stable polymer circuits directly onto the lateral surface of articles.

Alternatively or additionally, the information can be formed such that a portion of the information that is designed at least partly free from printing matter is perceived by the observer as a part of the information. An example of this is a motif formed by a portion of the information formed free of printing matter surrounded by at least one printing matter. An example of this is a content of an article that is formed as an at least partly transparent container with the content being visible through a portion of the information formed free of printing matter, where the surrounding printing matter or printing matters of the information in themselves complete this visible content to a form, a figure, a character, or an entire set of writing of a plurality of letters, such as, for instance, letters, numbers, punctuation marks and/or word marks.

In order to rotationally align the articles while they are being transferred from the infeed into outer packagings, the apparatus preferably comprises detection means for the information applied onto the articles, such as, for instance, alignment marks. Such detection means can comprise one or more imaging sensors, such as, for instance, one or more video cameras or photo cameras, as well as a control unit carrying out an image recognition algorithm, which control unit analyzes in real time an image of the infeed provided by the at least one imaging sensor with regard to the alignment of the arriving articles and produces control signals therefrom, which cause individual rotations of the individual gripper heads about their rotational axes running in parallel to the vertical axis in order to align the articles while they are being transferred.

Alternatively or additionally, at least one imaging sensor can be arranged such that it detects images of the articles having been seized and, for instance, lifted up by the gripping device, based on which images control signals are produced, which cause individual rotations of the individual gripper heads about their rotational axes running in parallel to the vertical axis in order to align the articles while they are being transferred and/or which images serve for a fine alignment of the articles. The images can be alternatively or additionally used for or serve for monitoring the actually effected alignment.

Alternatively or additionally, all gripper heads can be arranged at the manipulator head to be collectively movably driven about a pivoting axis running in parallel to the vertical axis, or a plurality of gripper heads can be arranged at the manipulator head to be groupwise movably driven about respectively one pivoting axis running in parallel to the vertical axis.

In this way, entire article groups formed by the articles seized and held by the gripper heads arranged at the manipulator head collectively movably driven pivotable about a pivoting axis running in parallel to the vertical axis can be collectively pivoted about the pivoting axis, alternatively or additionally to their individual alignment effected by individual rotations of the individual gripper heads about their rotational axes running in parallel to the vertical axis, for instance, for adaptation to a format of an outer packaging.

In a particularly preferred embodiment of the apparatus, this results in a plurality of degrees of freedom for the movement possibilities of the gripper heads of the gripping device at the manipulator head:

In a horizontal direction in parallel to the transport direction of the infeed and preferentially transversely, for instance, orthogonal to the horizontal axis, individually and/or groupwise translationally away from each other or toward each other. In this way, a plurality of articles can be simultaneously removed from the infeed, for instance, closely next to each other, in order to be then simultaneously transferred into a plurality of outer packaging staged on the staging surface spaced apart from each other, for instance. In this way, the apparatus is able to simultaneously transfer articles both into one or a few large or into a plurality of smaller outer packagings staged on the staging surface. The apparatus is therefore particularly variable and can also be used for different formats of outer packaging, thus preventing standstill periods due to different formats of outer packaging. Furthermore, a correction of the seizing positions of articles deformed in the infeed by the continuous pressure of following articles and/or standing differently closely spaced coming from the infeed can be carried out, thus effectively preventing standstill periods due to disturbances. In addition, an adaptation of the apparatus to differently spaced outer packaging staged on the staging surface in the course of consecutively following cycles can thus be carried out during ongoing operation, similar to the described possibility of adaptation to actual positions of the articles in the infeed.

In a horizontal direction orthogonal to the transport direction of the infeed and preferentially longitudinally, for instance in parallel to the horizontal axis individually and/or groupwise translationally in parallel to each other in the same or opposite directions, whereby, on the one hand, in connection with a), an adaptation to articles occupying differently sized base areas can be carried out in order to prevent standstill periods of the apparatus due to a change between articles with different article dimensions during the handling of articles, and whereby, on the other hand, different outer packaging can also be managed, such as, for instance, outer packaging with an arrangement of articles to be transferred thereinto differing from the right angularly arrangement. The articles placed into an outer packaging can be arranged, for instance, in a row linearly one after the other, or the articles placed into an outer packaging can be regularly arranged in rows and lines running right angularly toward each other. In order to assemble articles with sectionwise cylindrical or approximately cylindrical forms, such as, for instance, beverage cans or beverage bottles, as space-savingly as possible, the articles can form a so-called honeycomb assembly or sphere assembly, also termed a nested arrangement, in the outer packaging. In this context, the articles placed into an outer packaging in adjacent rows stand offset to another such that the gaps formed between the articles are as small as possible. The lines, then, do not run in a right angle to the rows, but rather diagonally. The lines can then run inclined to the rows in a straight line, or angled in a V-shape, or angled in a zigzag shape. Such a honeycomb or sphere arrangement represents an assembly of a given number of articles with the least possible base area. In summary, the articles can be arranged in an outer packaging linearly in one row or in a plurality of rows and lines, for instance, right angularly or in a nested arrangement. In dependence on the design of the outer packaging, a mixed arrangement is also conceivable. Thus, in summary, for instance, such outer packaging can be managed into which the articles are placed grouped in rows and lines running in a right angle to each other as well as such outer packaging into which the articles are placed in a nested arrangement.

Individually rotational about rotational axes running in parallel to the vertical axis, whereby the articles can be individually aligned while they are being transferred.

Collectively and/or groupwise rotational about one or more pivoting axes running in parallel to the vertical axis, whereby the articles can be transferred collectively or groupwise into outer packaging of different formats, for instance, outer packaging staged longitudinally or transversely on the staging surface.

By a collective lifting and lowering of the manipulator head and thus of the gripper heads arranged thereat, the apparatus is furthermore able to handle articles and outer packaging of different heights.

A second object of the invention relates to a method for handling articles. The handling here provides to continuously or discontinuously remove a plurality of articles simultaneously from an infeed of articles being transported in a transport direction by means of, for instance, one or more conveyors, in, for instance, one or more article flows of continuous, immediately consecutive articles and/or articles that are spaced apart from one another, for instance, already grouped according to their number and/or already spaced apart from one another according to their later arrangement in an outer packaging, and transfer them into at least one outer packaging staged on a staging surface.

The method provides at least a plurality of articles arriving consecutively in a transport direction to be removed from the infeed by being seized and/or gripped, coming from above, and then being lifted up.

In this context, a plurality of articles can also be removed simultaneously from the infeed as seen transversely to the transport direction, for instance, from a plurality of rows running in parallel to each other in transport direction, for instance, separated from each other by lane separators and respectively forming an own article flow.

After removing the articles from the infeed, the method provides to arrange and thus group the articles, while they are simultaneously being lifted up and collectively transferred from the infeed to a staging surface, on which one or more outer packagings are staged, into which the articles removed from the infeed are to be placed, individually or groupwise as seen in a direction in parallel to the transport direction, by an increase and/or decrease of individual distances between the articles as seen in transport direction, corresponding to an arrangement to be produced prior to placing the articles into the outer packaging, this arrangement being defined by one or more outer packagings staged on the staging surface.

The method subsequently provides to simultaneously lower and release the articles having been arranged corresponding to an arrangement to be produced prior to placing the articles into the outer packaging, this arrangement being defined by one or more outer packagings staged on the staging surface, into the one or more outer packagings staged on the staging surface.

Subsequent to this, the method can be repeated, beginning with the first method step, while it can be provided at the same time that the outer packagings, into which articles have been placed, are removed from the staging surface and new, empty outer packagings are staged on the staging surface, while the method steps:

simultaneous removal of the articles from the infeed, as well as arrangement of the articles corresponding to an arrangement to be produced prior to placing the articles into the outer packaging, this arrangement being defined by one or more outer packagings staged on the staging surface, while the articles are simultaneously being lifted up and transferred from the infeed to the staging surface, are being carried out.

The method can additionally provide that the articles, after the removal of the articles from the infeed, are arranged, while still being lifted up and transferred from the infeed to a staging surface, individually or groupwise as seen in a direction transversely, for instance orthogonal to the transport direction, by an increase and/or decrease of individual distances between the articles as seen transversely, for instance orthogonal to the transport direction, corresponding to an arrangement to be produced prior to placing the articles into the outer packaging, this arrangement being defined by one or more outer packagings staged on the staging surface.

Alternatively or additionally, the method can provide that the articles are aligned, while still being lifted up and transferred from the infeed to a staging surface after the removal of the articles from the infeed, by individual rotation of each article about own rotational axes running in parallel to a vertical axis.

Alternatively or additionally, the method can provide that the articles are arranged, while still being lifted up and transferred from the infeed to a staging surface after removing the articles from the infeed, by collective rotation of all articles or groups of articles about one or more pivoting axes running in parallel to a vertical axis.

The method can provide that the articles to be simultaneously transferred into one or more outer packagings staged on the staging surface are collectively removed from the infeed during their movement in transport direction.

Alternatively or additionally, the method can provide that the effective actual positions of the articles in the infeed are detected for the removal of the articles from the infeed, and that the removal of the articles from the infeed is carried out adapted to these actual positions.

Both the apparatus and the method can alternatively or additionally have individual or a combination of a plurality of features initially described in connection with the prior art and/or in one or more documents mentioned regarding the prior art.

Moreover, the apparatus can alternatively or additionally have individual or a combination of a plurality of features described previously or in the following in connection with the method, as well as the method can alternatively or additionally have individual or a combination of a plurality of features described previously or in the following in connection with the apparatus.

The apparatus and the method have a particularly high efficiency by the measures taken.

By the measures taken, the apparatus and the method allow a high pacing in handling articles and they completely eliminate standstill periods to a minimum that is inevitable when changing articles and/or outer packaging.

The apparatus and the method enable a high variability, by the measures taken, when seizing articles from an infeed and transferring them into outer packaging.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention. The same or equivalent elements of the invention are designated by identical reference characters. Furthermore and for the sake of clarity, only the reference characters relevant for describing the respective figure are provided. It should be understood that the detailed description and specific examples of the device and method according to the invention, while indicating preferred embodiments, are intended for purposes of illustration only and are not intended to limit the scope of the invention. The schematic illustrations show as follows:

FIG. 12A shows a schematic diagram where the respective movement drive of the gripper head groups has not yet been adapted to the respective detected actual positions of the articles. FIG. 12B shows a schematic diagram where the respective movement drive of the gripper head groups have been adapted to the respective detected actual positions of the articles.

DETAILED DESCRIPTION OF THE INVENTION

Figure 1:
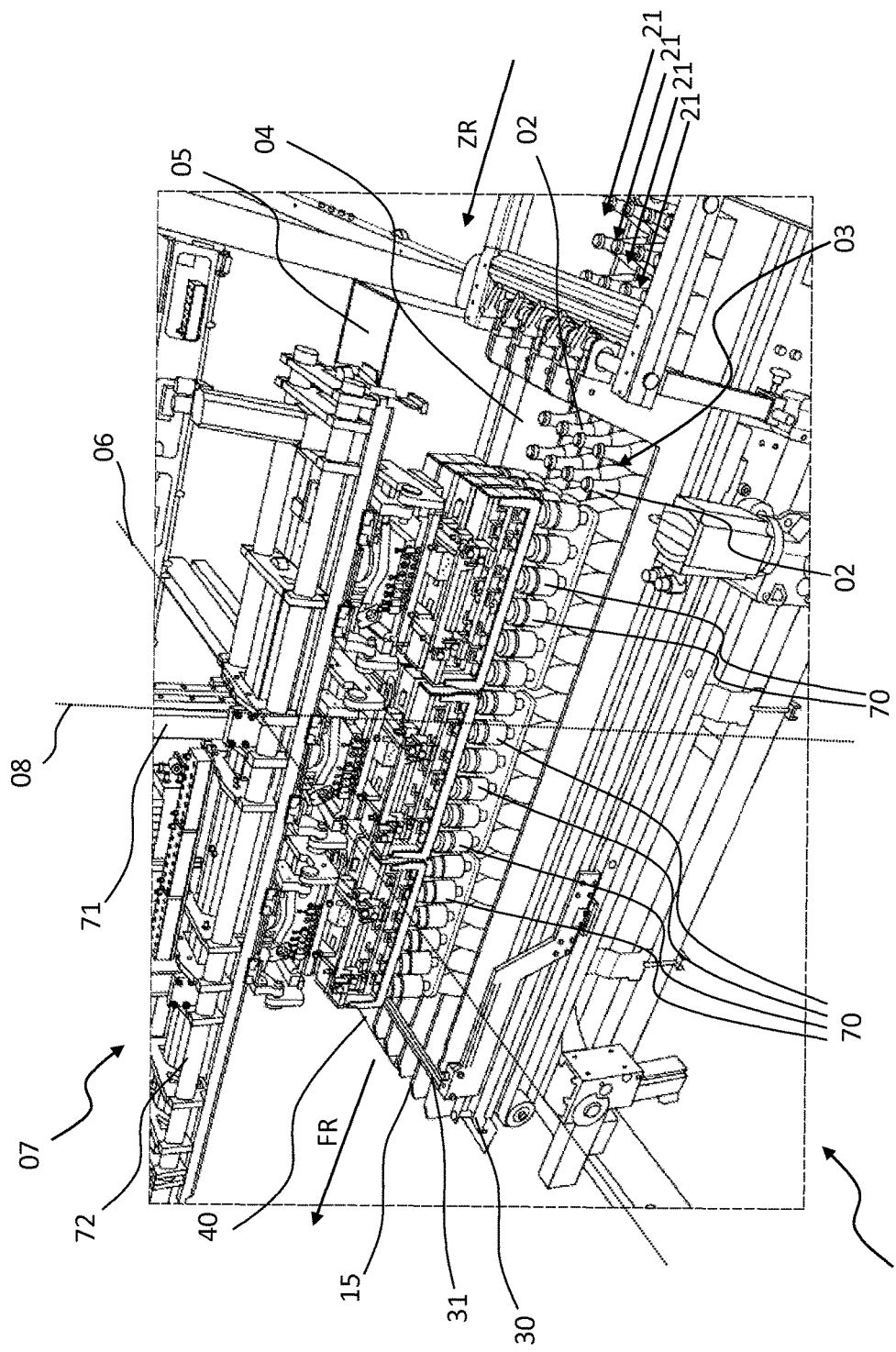
FIG. 1 shows a perspective view of a snapshot illustration recurring after the snapshot illustration in FIG. 10 of an apparatus according to the invention for the handling of articles, which handling provides that a plurality of articles are simultaneously removed from an infeed and transferred into at least one outer packaging staged on a staging surface.

An apparatus 01 as illustrated entirely or in parts in FIG. 1 to FIG. 10 for the handling of articles 02, which handling provides to simultaneously remove a plurality of articles 02 from an infeed 03 and to transfer them into at least one outer packaging 05 staged on a staging surface 04, comprises:

the infeed 03 of articles 02 being transported continuously or discontinuously in a transport direction FR, for instance, in one or more article flows 21, which are respectively illustrated by arrows, of continuous, immediately consecutive articles 02 or articles 02 that are already grouped according to their number and/or already spaced apart from one another according to their later arrangement in an outer packaging 05, at least one staging surface 04 arranged next to the infeed 03 as seen in the direction of a horizontal axis 06, on which staging surface 04 outer packagings 05 have been and/or are being staged, which outer packagings 05 are to be filled with the articles 02 having been removed from the infeed 03, and from which staging surface 04 the outer packagings 05 are discharged after the articles 02 have been placed therein.

a gripping device 07 for simultaneously seizing a plurality of articles 02 from the infeed 03, which gripping device 07 has one gripper head 70 per article, for instance tulip-shaped grippers or one or more gripper fingers, or the like, which gripper head 70 is lowerable coming from above onto an article 02 in the infeed 03.

The gripping device 07 has at least one manipulator 71 with a manipulator head 72 that is at least horizontally movable along a horizontal axis 06, and also vertically movable along a vertical axis 08. In order to be able to horizontally move the gripper heads 70 of the gripping device 07 between the infeed 03 and one or more outer packagings 05 staged on the staging surface 04, and also to move them vertically in space for the purpose of lifting the simultaneously seized articles 02 from the infeed 03 as well as lowering the lifted, simultaneously seized articles 02 into the one or more outer packagings 05 staged on the staging surface 05, the gripper heads 70 of the gripping device 07 are arranged at the manipulator head 72.

The gripper heads 70 are arranged at the manipulator head 72 to be individually and/or groupwise translationally movably driven relative to each other in at least a first horizontal direction in parallel to the transport direction FR of the infeed 03.

Thus, the distance between a plurality of articles 02 being simultaneously removed from the infeed 03 can at least be changed, whereby these articles 02, while being transferred, can in turn be divided up, for instance into groups 20 to be respectively placed into one outer packaging 05 each, and be simultaneously placed into the outer packagings 05 staged on the staging surface 04.

In this way, a plurality of articles 02 arriving, for instance, closely one after the other as seen in direction of the transport direction FR in one or more rows, for instance, respectively forming one article stream 21, positioned in parallel next to each other transversely to the transport direction FR, can be simultaneously removed from the infeed 03, and be divided up to a plurality of outer packagings 05 staged on the staging surface 04 spaced apart from each other, for instance, in a direction in parallel to the transport direction FR, and be simultaneously placed into them.

This dividing is carried out by the articles 02 having been removed from the infeed 03, while being lifted up and transferred from the infeed 03 to the staging surface 04, being grouped by changing the individual distances between individual, lifted articles 02. This grouping is carried out corresponding to an arrangement of the articles 02 in an outer packaging 05, into which the articles 02 having been grouped to a group 20 are placed.

The infeed 03 comprises articles 02 being transported by means of, for instance, one or more conveyors 30 continuously or discontinuously in transport direction FR in one or more article flows 21, which are formed, for instance, by rows of articles 02 running parallelly in transport direction FR separated from each other, for instance, by lane separators 15, of continuous, immediately consecutive articles 02 and/or articles 02 that are spaced apart from one another, for instance, articles 02 that are already grouped according to their number and/or already spaced apart from one another according to their later arrangement in an outer packaging 05.

The outer packaging 05 can be closed on the spot on the staging surface 04 before being discharged, for instance, by means of lids or by folding shut and closing of flaps, for instance, which can be formed by cardboard packaging walls, which are connected with the outer packaging 05 by bending edges.

The at least one manipulator 71 can be, for instance, a multi-axis robot arm, for example with six axes, or a gantry or a tripod or quadropod, which is laterally movable back and forth along the horizontal axis 06 as well as being liftable and lowerable along the vertical axis 08, to name but a few conceivable manipulators 71.

The first horizontal direction preferentially runs transversely, particularly preferentially orthogonal to the horizontal axis 06.

Figure 2:
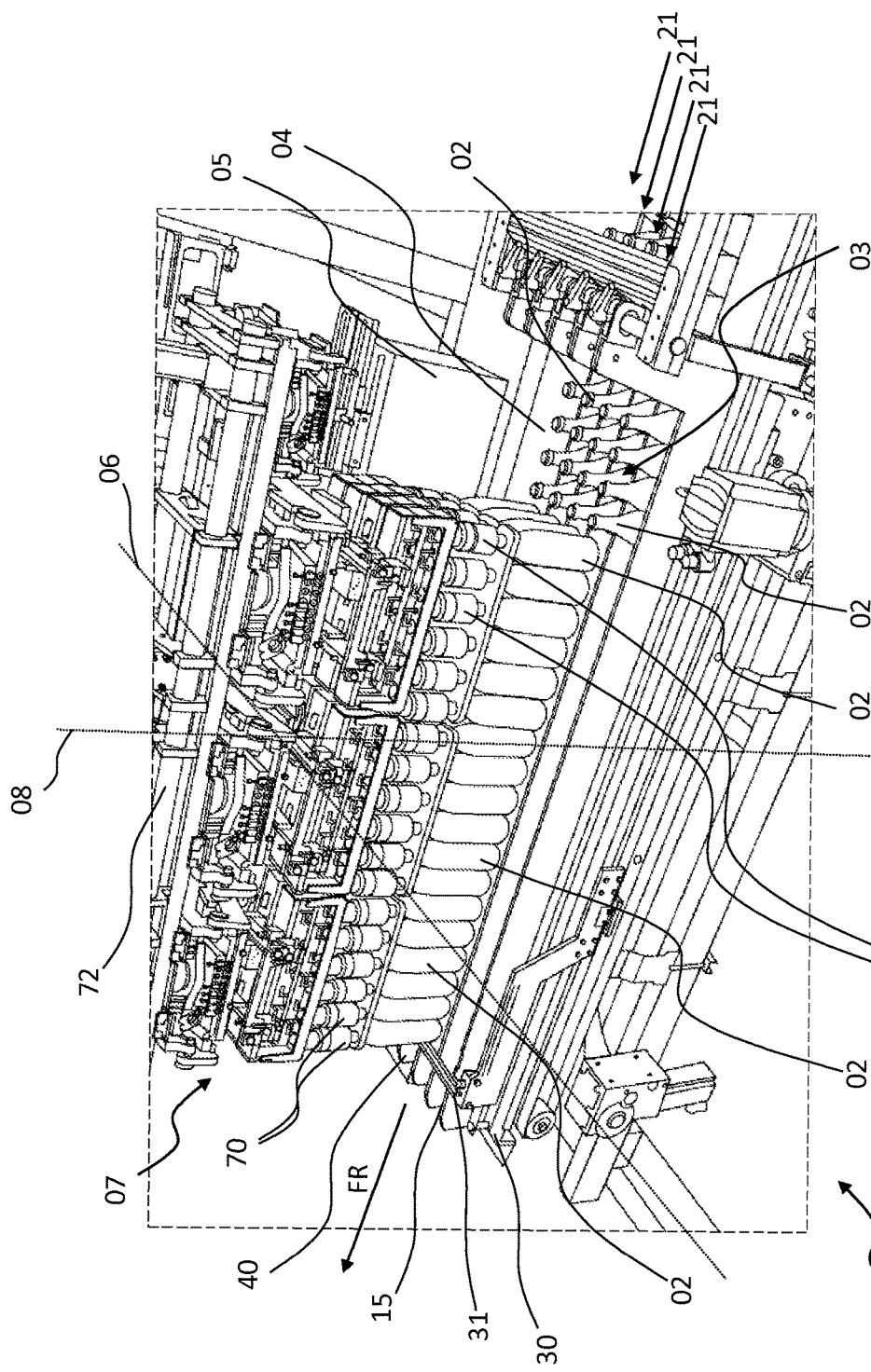
FIG. 2 shows a perspective view of a snapshot illustration temporally immediately following the snapshot illustration in FIG. 1.
Figure 3:
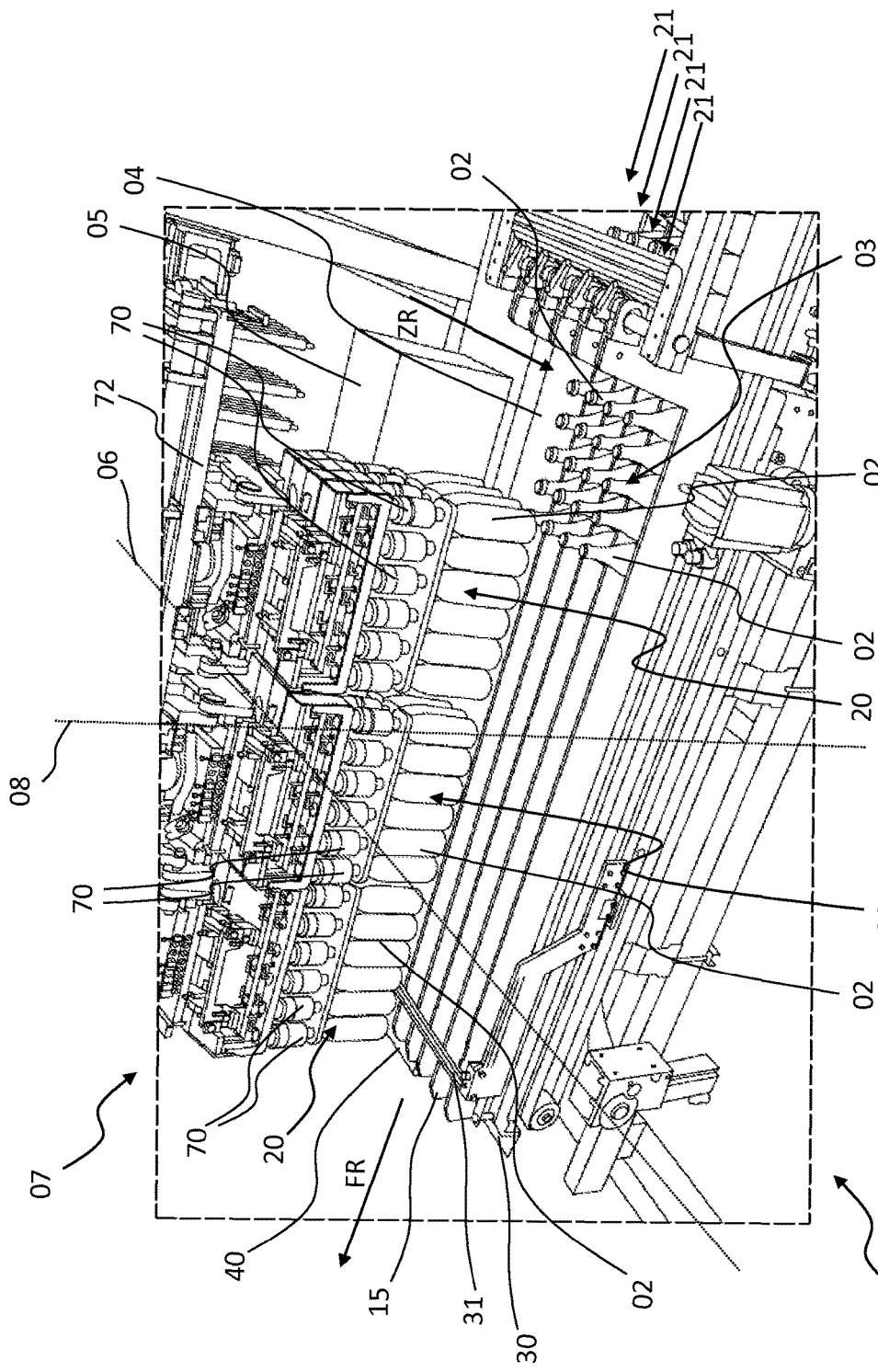
FIG. 3 shows a perspective view of a snapshot illustration temporally immediately following the snapshot illustration in FIG. 2.
Figure 4:
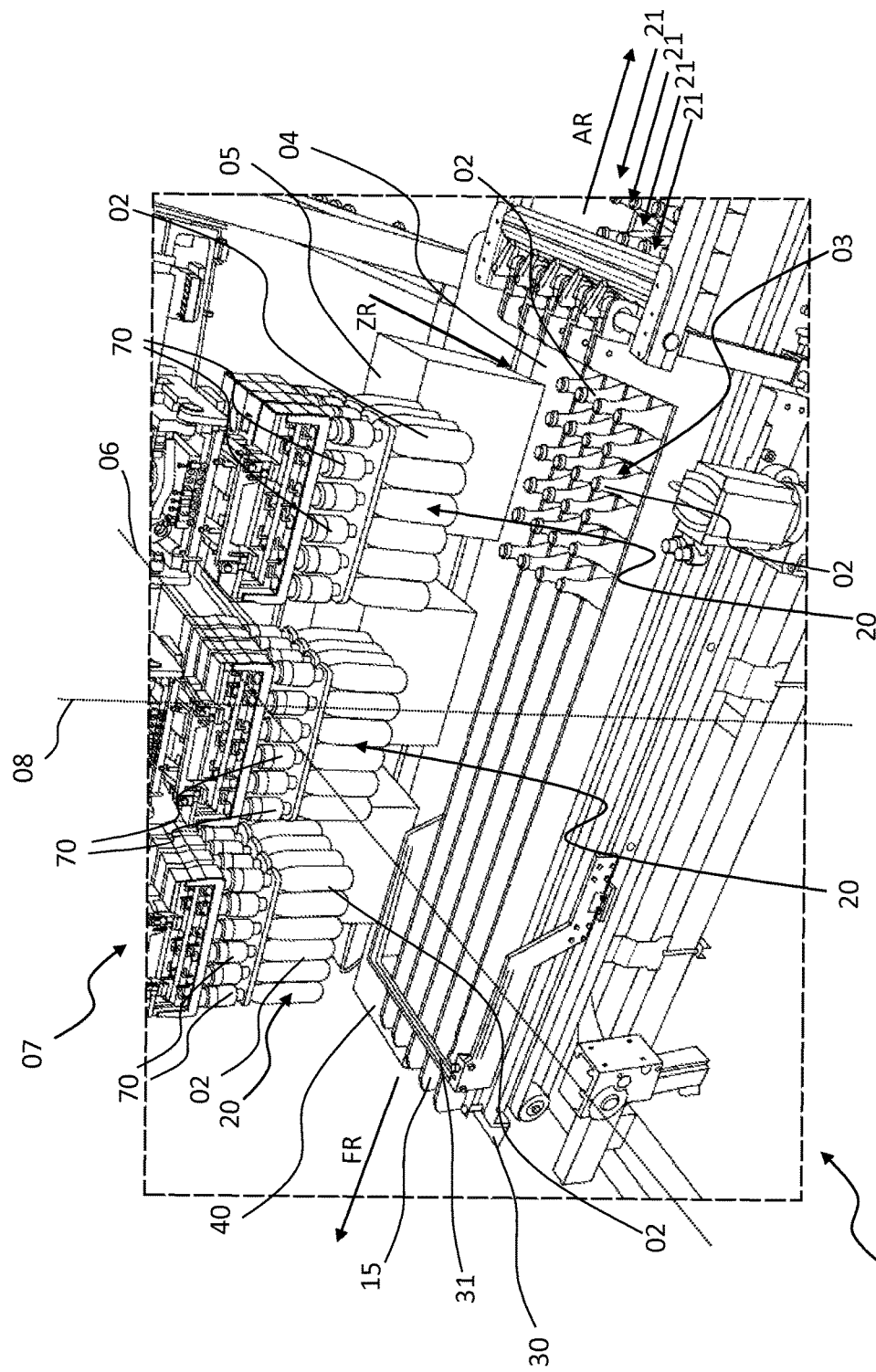
FIG. 4 shows a perspective view of a snapshot illustration temporally immediately following the snapshot illustration in FIG. 3.
Figure 10:
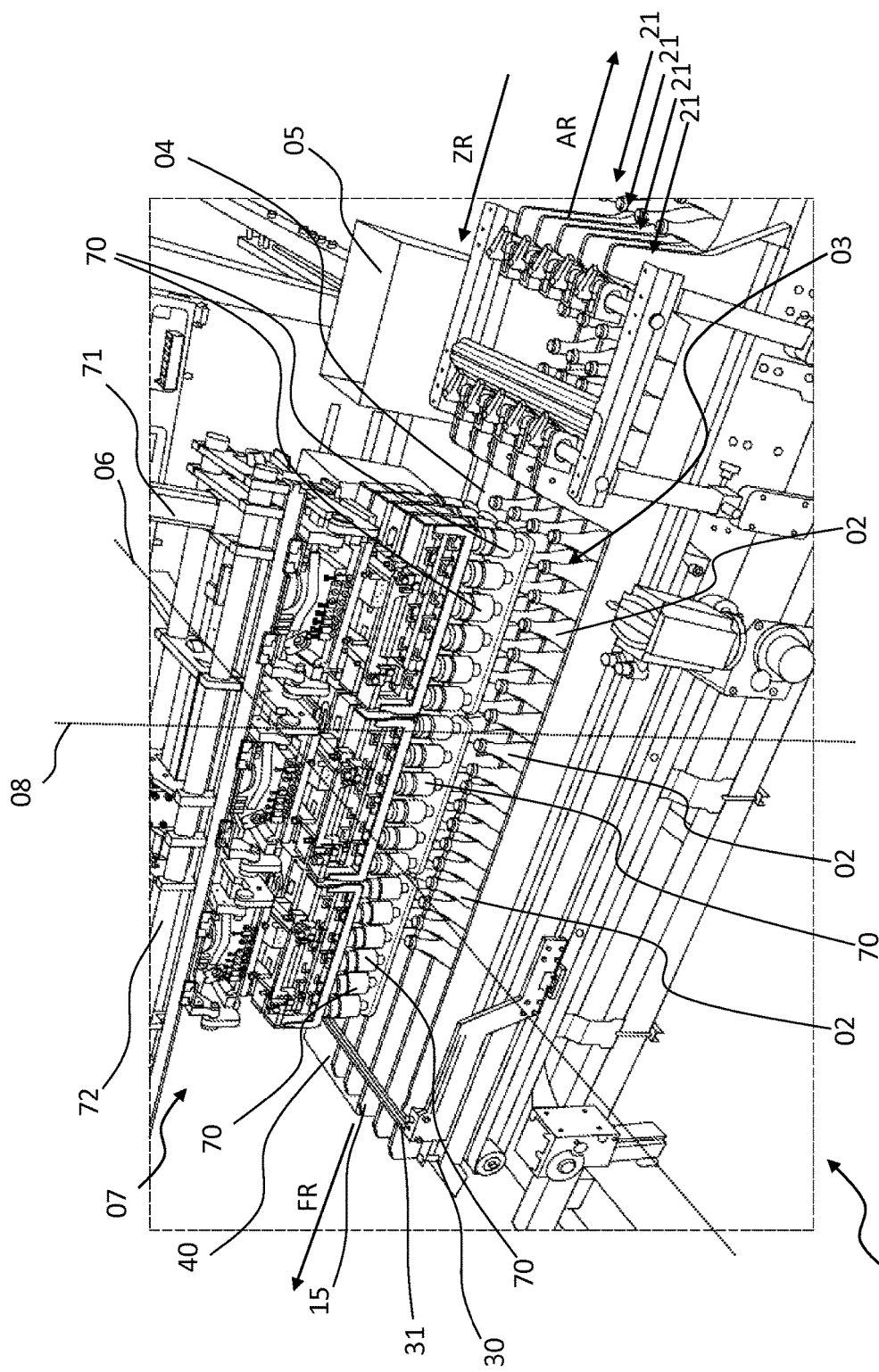
FIG. 10 shows a perspective view of a snapshot illustration temporally immediately following the snapshot illustration in FIG. 9.

In addition, the gripper heads 70 can be arranged at the manipulator head 72 to be collectively translationally movably driven in the first horizontal direction in parallel to the transport direction FR of the infeed 03, as is illustrated in temporal sequence in FIG. 10, FIG. 1, and FIG. 2. In this way, the gripper heads 70 can be lowered onto the articles 02 arriving preferably continuously successively in the infeed 02 and can be moved along with them even while articles 02 of the infeed 03 are still closing a gap resulting from a previous removal of articles 02 from the infeed 03, such that, already as soon as the transported article 02 or articles 02 arriving foremost in the infeed 03 reach a foremost removal position at the end 31 of the infeed 03, as seen opposite to the transport direction FR, these and following articles 02 can already be seized and, as the case may be, already removed from the infeed 03. In this way, a particularly high pacing can be achieved.

As an alternative or in addition to a translational collective movement of the gripper heads 70 at the manipulator head 72, the entire manipulator head 72 together with the gripper heads 70 arranged thereat can be movable in transport direction FR of the infeed 03.

In order to be able to adapt the removal positions of the gripper heads 70 at the manipulator head 72 to the actual positions of the articles 02 in the infeed 03, the apparatus 01 can comprise detection means 17 for detecting the actual positions of the articles based on a foremost removal position at the end 31 of the infeed 03 as seen opposite to the transport direction FR of the infeed 03.

The detection means 17 can comprise one or more imaging sensors, such as, for instance, one or more video cameras or photo cameras, as well as a control unit carrying out an image recognition algorithm, which control unit analyzes in real time an image of the infeed 03 provided by the at least one imaging sensor with regard to the actual positions of the successively, as seen from the end 31 of the infeed 03 opposite the transport direction FR of the infeed 03, consecutively arriving and/or accumulated articles 02, and produces control signals therefrom, which cause individual, translational movements in a direction in parallel to the transport direction FR of the individual gripper heads 70 at the manipulator head 72 in order to adapt the removal positions of the gripper heads 70 to the actual positions of the articles 02 in the infeed 03.

In connection with a detection of the actual positions of the articles 02 of the infeed 03 arriving closely one after the other in transport direction FR, this results in the possibility to align the removal positions of the gripper heads 70 with these actual positions, thus preventing errors in the detection of individual articles 02 from the infeed 03. Such errors can, for instance, be caused by articles 02, which are deformed by the pressure of following articles 02 in the infeed 03. Since most of the articles 02 are seized in the area of the center of mass of their cover surface for their removal from the infeed 03—in the instance of articles 02 formed as beverage bottles, this is where the bottle neck and the closing cap are located—a deformation with the simultaneous removal of a plurality of consecutive articles 02, for instance, six, twelve, eighteen, or more, can result in a substantial misalignment of the required removal position of an article 02 to be seized further behind, as seen opposite to the transport direction FR of the infeed 03, in relation to a foremost removal position.

The removal positions, which the gripper heads 70 take up for seizing the individual articles 02 from the infeed 03, can be adapted to the actual positions of the articles 02 in the infeed 03 by the possibility of translational movements of the gripper heads 70 in relation to each other in parallel to the transport direction FR.

The gripper heads 70 can additionally be arranged at the manipulator head 72 to be movably driven relative to each other in a second horizontal direction orthogonal to the transport direction FR of the infeed 03. Preferentially, this second horizontal direction runs orthogonal to the first horizontal direction.

In this way, a plurality of articles 02 arriving next to each other, for instance, in a plurality of rows, respectively formed, for instance, by an article stream 21 or forming such an article stream 21, positioned in parallel transversely to the transport direction FR, can be simultaneously removed from the infeed 03 and divided up to a plurality of outer packaging 05 staged on the staging surface 04 spaced apart from each other, for instance, in a direction in transversal to the transport direction FR, and be simultaneously placed into them. Generally, it is also possible in this way to simultaneously remove a plurality of articles 02 arriving in only one row from the infeed 03 and divide them up to a plurality of outer packaging 05 staged on the staging surface 04 spaced apart from each other, for instance, whereby, while the articles 02 having been removed from the infeed 03 are lifted up, the articles 02 can be grouped to one or more arrangements in, for instance, right angularly and/or diagonally arranged rows and lines, and subsequently the groups 20 of articles 02 thus acquired can be simultaneously placed into the outer packagings 05 staged on the staging surface 04.

Furthermore, the possibility of the translational movement of the gripper heads 70 orthogonal to the transport direction FR of the infeed 03 results in the possibility of an adaptation to different article dimensions as seen in a direction transversal to the transport direction FR, when the articles 02 arrive in a plurality of parallel article flows 21 separated from each other by parallel lane separators 15.

By means of gripper heads 70 arranged at the manipulator head 72 to be individually translationally movably driven in respectively two independent horizontal directions in connection with detection means for the actual positions of the articles 02 both in a direction in parallel as well as transversal to the transport direction FR, the apparatus 01 is moreover able to remove articles 02 from an infeed 03 consisting of a disorderly mass flow of articles 02 arriving disorderly and closely next to each other both longitudinally and transversely to the transport direction FR.

Alternatively or additionally, the gripper heads 70 can be arranged at the manipulator head 72 to be rotationally movably driven respectively individually and thus relative to each other about rotational axes running in parallel to the vertical axis 08.

In this way, the articles 02 can be aligned, for instance, all identically or respectively individually toward the periphery of the outer packaging 05 during the transferring into outer packagings 05 such that, for instance, information applied onto the articles 02 is readable from the outside when the articles 02 have been placed into the outer packagings 05, or such that all articles 02 are aligned in the same direction, for instance, when the outer packaging 05 forms a sales unit, for instance, a display, or can be used as such. This increases the impression of the quality of outer packagings 05 having been provided with articles 02 by the apparatus 01 according to the invention.

Each article 02 has a base serving as contact surface of the article 02, which base can be, for instance, circular or oval or regularly or irregularly triangular, rectangular, or polygonal, a cover surface spaced apart from the base by one height of the article 02 extending along a vertical axis standing normal upon the base, which cover surface is, for instance, similar or congruent in the mathematical and/or geometrical sense to the base, as well as a lateral surface connecting the circumference of the base with the circumference of the cover surface.

Extending from the center of mass of the base to the center of mass of the cover surface is a central axis, along which the centers of mass of all consecutive cross-section surfaces of the article 02 situated in parallel to the base are located.

A central axis in this case can be defined, for instance, as a continuous or discontinuous mathematical curve, on which the centers of mass of all consecutive cross-section surfaces of the article 02 are located. A result of this potential discontinuity is the possibility that the article 02 has different central axes in consecutive sections or areas, and therefore, whenever a central axis is mentioned in the following text, this can refer to at least one central axis.

The result for an article 02 is an essentially cylindrical form, which can, however, have changing geometries of the consecutive cross-section surfaces situated in parallel to the base along the height of the article 02, corresponding to a cone, a truncated cone, or a combination of cylinder and/or cone and/or truncated cone, for example. The cross-section surfaces can also be arranged similar to an oblique cylinder to be at least sectionwise offset to each other along the height of the article 02 in a direction in parallel to the base. Generally, any forms of an article 02 are conceivable, for instance, organic forms, whether as a part of or for the entire external form.

If the article 02 has the form of a rotation body the central axis of which stands normal upon the base, the central axis corresponds to the vertical axis. An example of this is a straight cylinder, or a bottle form.

Base and cover surface can be arranged in parallel but also obliquely to each other, as is known, for instance, from articles 02 designed as beverage containers in the form of a beverage carton.

If the article 02 is designed as a container, such as a beverage container in the form of a bottle, the entire cover surface can be taken up by an opening being closable by means of a lid.

One or more articles 02 can be designed to be tapered, for instance, above and/or below at least one body of information.

If the articles 02 in the infeed 03 are being transported standing upright on their contact surfaces, the rotational axes running in parallel to the vertical axis 08, about which rotational axes the gripper heads 70 are respectively individually arranged at the manipulator head 72 rotationally movably driven, also run in parallel to the vertical axes of the articles 02.

By way of the gripper heads 70 of the gripping device 07 being arranged at the manipulator head 72 to be individually rotationally movable about the rotational axes running in parallel to the vertical axis 08, the articles 02 can be aligned respectively individually by turning about their vertical axis 08, for instance, by aligning information applied onto the individual articles 02 about the article 02 and/or its contents in a similar manner and/or directed to be generally visible to the outside.

In order to rotationally align the articles 02 while they are being transferred from the infeed 03 into outer packagings 05, the apparatus 01 preferably comprises detection means, for instance, for the information applied onto the articles 02, such as, for instance, alignment marks. Such detection means can comprise one or more imaging sensors, such as, for instance, one or more video cameras or photo cameras, as well as a control unit carrying out an image recognition algorithm, which control unit analyzes in real time an image of the infeed provided by the at least one imaging sensor with regard to the alignment of the arriving articles 02 and produces control signals therefrom, which cause individual rotations of the individual gripper heads 70 about their rotational axes running in parallel to the vertical axis 08 in order to align the articles 02 while they are being transferred.

Alternatively or additionally, at least one imaging sensor can be arranged such that it detects images of the articles 02 having been seized and, for instance, lifted up by the gripping device 07, based on which images control signals are produced, which cause individual rotations of the individual gripper heads 70 about their rotational axes running in parallel to the vertical axis 08 in order to align the articles 02 while they are being transferred and/or which images serve for a fine alignment of the articles 02. The images can alternatively or additionally be used for or serve for monitoring the actually effected alignment.

As an alternative or in addition to the previously described arrangement, in which the gripper heads 70 are arranged at the manipulator head 72 individually twistable respectively about own rotational axes running in parallel to the vertical axis 08, it can be provided that all gripper heads 70 are arranged at the manipulator head 72 collectively movably driven pivotable about a pivoting axis running in parallel to the vertical axis 08, or, respectively, a plurality of gripper heads 70 groupwise movably driven pivotable about respectively one pivoting axis running in parallel to the vertical axis 08.

In this way, entire groups 20 formed by the articles 20 seized and held by the gripper heads 70 arranged at the manipulator head 72 collectively movably driven pivotable about a pivoting axis running in parallel to the vertical axis 08 can be collectively pivoted about the pivoting axis running in parallel to the vertical axis 08, alternatively or additionally to their individual alignment effected by individual rotations of the individual gripper heads 70 about their rotational axes running in parallel to the vertical axis 08, for instance, for adaptation to a format of an outer packaging 05.

In summary, this results in a plurality of degrees of freedom for the movement possibilities of the gripper heads 70 of the gripping device 07 at the manipulator head 72 in a particularly preferred embodiment:

In a horizontal direction in parallel to the transport direction FR of the infeed 03 and preferentially transversely, for instance, orthogonal to the horizontal axis 06, individually and/or groupwise translationally away from each other or toward each other. In this way, a plurality of articles 02 can be simultaneously removed from the infeed 03, for instance, closely next to each other, in order to be then simultaneously transferred into a plurality of outer packagings 05 staged on the staging surface 04 spaced apart from each other, for instance. In this way, the apparatus 01 is able to simultaneously transfer articles 02 both into one or a few large or into a plurality of smaller outer packagings 05 staged on the staging surface 04. The apparatus 01 is therefore particularly variable and can also be used for different formats of outer packagings 05, thus preventing standstill periods due to different formats of outer packagings 05. Furthermore, a correction of the seizing positions of articles 02 deformed in the infeed 03 by the continuous pressure of following articles 02 and/or standing differently closely spaced coming from the infeed 03 can be carried out, thus effectively preventing standstill periods due to disturbances. In addition, an adaptation of the apparatus 01 to differently spaced outer packagings 05 staged on the staging surface 04 in the course of consecutively following cycles, respectively illustrated by a temporal sequence illustrated in FIG. 1 to FIG. 10, can thus be carried out during ongoing operation, similar to the described possibility of adaptation to actual positions of the articles 02 in the infeed 03.

In a horizontal direction orthogonal to the transport direction TR of the infeed 03 and preferentially longitudinally, for instance in parallel to the horizontal axis 06 individually and/or groupwise translationally in parallel to each other in the same or opposite directions, whereby, on the one hand, in connection with a), an adaptation to articles 02 occupying differently sized base areas can be carried out in order to prevent standstill periods of the apparatus 01 due to a change between articles 02 with different article dimensions during the handling of articles 02, and whereby, on the other hand, different outer packagings 05 can also be managed, such as, for instance, outer packagings 05 with an arrangement of articles 02 to be transferred thereinto differing from the right angularly arrangement. The articles 02 placed into an outer packaging 05 can be arranged, for instance, in a row linearly one after the other, or the articles 02 placed into an outer packaging 05 can be regularly arranged in rows and lines running right angularly toward each other. In order to assemble articles 02 with sectionwise cylindrical or approximately cylindrical forms, such as, for instance, beverage cans or beverage bottles, as space-savingly as possible, the articles 02 can form a so-called honeycomb assembly or sphere assembly, also termed a nested arrangement, in the outer packaging 05. In this context, the articles 02 placed into an outer packaging 05 in adjacent rows stand offset to another such that the gaps formed between the articles 02 are as small as possible. The lines, then, do not run in a right angle to the rows, but rather diagonally. The lines can then run inclined to the rows in a straight line, or angled in a V-shape, or angled in a zigzag shape. Such a honeycomb or sphere arrangement represents an assembly of a given number of articles 02 with the least possible base area. In summery, the articles 02 can be arranged in an outer packaging 05 linearly in one row or in a plurality of rows and lines, for instance, right angularly or in a nested arrangement. In dependence on the design of the outer packaging 05, a mixed arrangement is also conceivable. Thus, in summary, for instance, such outer packagings 05 can be managed into which the articles 02 are placed grouped in rows and lines running in a right angle to each other as well as such outer packagings 05 into which the articles 02 are placed in a nested arrangement.

Individually rotational about rotational axes running in parallel to the vertical axis 08, whereby the articles 02 can be individually aligned while they are being transferred.

Collectively and/or groupwise rotational about one or more pivoting axes running in parallel to the vertical axis 08, whereby the articles 02 can be transferred collectively or groupwise into outer packagings 05 of different formats, for instance, outer packagings 05 staged longitudinally or transversely on the staging surface 04.

By a collective lifting and lowering of the manipulator head 72 and thus of the gripper heads 70 arranged thereat, the apparatus 01 is furthermore able to handle articles 02 and outer packagings 05 of different heights.

The staging surface 04 can comprise at least one conveyor 40, for instance, in the form of one or more horizontal conveyors, on which the outer packagings 05 have been or are being staged, or the staging surface 04 can be comprised by such a conveyor 40.

By means of at least one of the conveyor 40 comprised by the staging surface 04 or one staging surface 04 formed, for instance, by a continuously or intermittently operated conveyor 40, the outer packagings 05 can be discharged in a discharge direction AR indicated by an arrow after the articles 02 have been placed therein. In this context, the discharge direction can run in parallel to the transport direction FR of the infeed in the same direction or in the opposite direction of the infeed.

Alternatively or additionally, by means of the at least one conveyor 40 comprised by the staging surface 04, the outer packagings 05 can be supplied in an infeed transport direction ZR indicated by an arrow prior to placing the articles 05 therein.

The staging surface 04 can be arranged next to an infeed conveyor and/or to a discharge conveyor or between an infeed conveyor and a discharge conveyor, with the outer packagings 05 being pushed over for their staging on the staging surface 04, for instance, transversely to an infeed transport direction ZR, onto the staging surface 04 and/or with the outer packagings 05, after the articles 02 have been placed therein on the staging surface 04, being pushed over for their discharge, for instance, transversely to a discharge direction AR, from the staging surface 04 onto a discharge conveyor.

The discharge direction AR and/or the infeed transport direction ZR preferentially runs in parallel to the transport direction FR of the infeed 03.

Preferentially, the staging surface 04 is positioned in parallel to the infeed 03 and to its transport direction FR—as the case may be, spaced apart, as seen transversely to the infeed transport direction ZR and/or discharge direction AR, by the width of an infeed conveyor and/or of a discharge conveyor.

The infeed 03 can comprise at least one conveyor 30 or be formed by at least one conveyor 30, for example in the form of one or more horizontal conveyors, on which the articles 02 are transported continuously or discontinuously in a transport direction FR in one or more article flows 21, separated from each other, for instance, by lane separators 15, of continuous, immediately consecutive articles 02 or articles 02 that are already grouped according to their number and/or already spaced apart from one another according to their later arrangement in the outer packaging 05.

The apparatus 01 can furthermore comprise a control device, which at least:

controls the at least one manipulator 71 such that it carries out a cyclical movement path, in the course of which the manipulator head 72 lowers the gripper heads 70 from above onto articles 02 of the infeed 03, lifts them up again, traverses to the staging surface, lowers the gripper heads 70 into outer packagings 05 staged on the staging surface 04, lifts them up again, and finally traverses over the infeed 03 again, and controls the gripper heads 70 of the gripping device 07 such that, after the lowering of the manipulator head 72 from above onto articles 02 of the infeed 03, each gripper head 70 seizes respectively one article 02 of the infeed 03 and holds it until the gripper heads 70 have been lowered into outer packagings 05 staged on the staging surface 04 in the course of the cyclical movement path of the manipulator 71.

Such a control device can moreover control the staging of empty outer packagings 05 on the staging surface 04, as well as the discharge of outer packagings with articles 02 placed therein from the staging surface 04.

A previously described apparatus 01 can carry out a method for the handling of articles 02 as is exemplarily illustrated in its course in the sequence of the FIG. 1 to FIG. 10, which handling provides to simultaneously remove a plurality of articles 02 from an infeed 03 and to transfer them into at least one outer packaging 05 staged on a staging surface 04.

Such a method provides at least a plurality of articles 02 arriving consecutively in a transport direction FR of the infeed 03 to be first removed from the infeed 03 by being seized and/or gripped, coming from above, and then being lifted up, as is illustrated in temporal sequence in FIG. 10, FIG. 1, and FIG. 2.

Subsequently, the method provides to arrange and thus group the articles 02, while they are simultaneously being lifted up and, as is illustrated in temporal sequence in FIG. 2, FIG. 3, FIG. 4, and FIG. 5, collectively transferred from the infeed 03 to a staging surface 04, on which one or more outer packagings 05 are staged, into which the articles 02 removed from the infeed 03 are to be placed, individually or groupwise as seen in a direction in parallel to the transport direction, by an increase and/or decrease of individual distances between the articles 02 as seen in transport direction FR, corresponding to an arrangement to be produced prior to placing the articles 02 into the outer packagings 05, this arrangement being defined by one or more outer packagings 05 staged on the staging surface 04.

Figure 5:
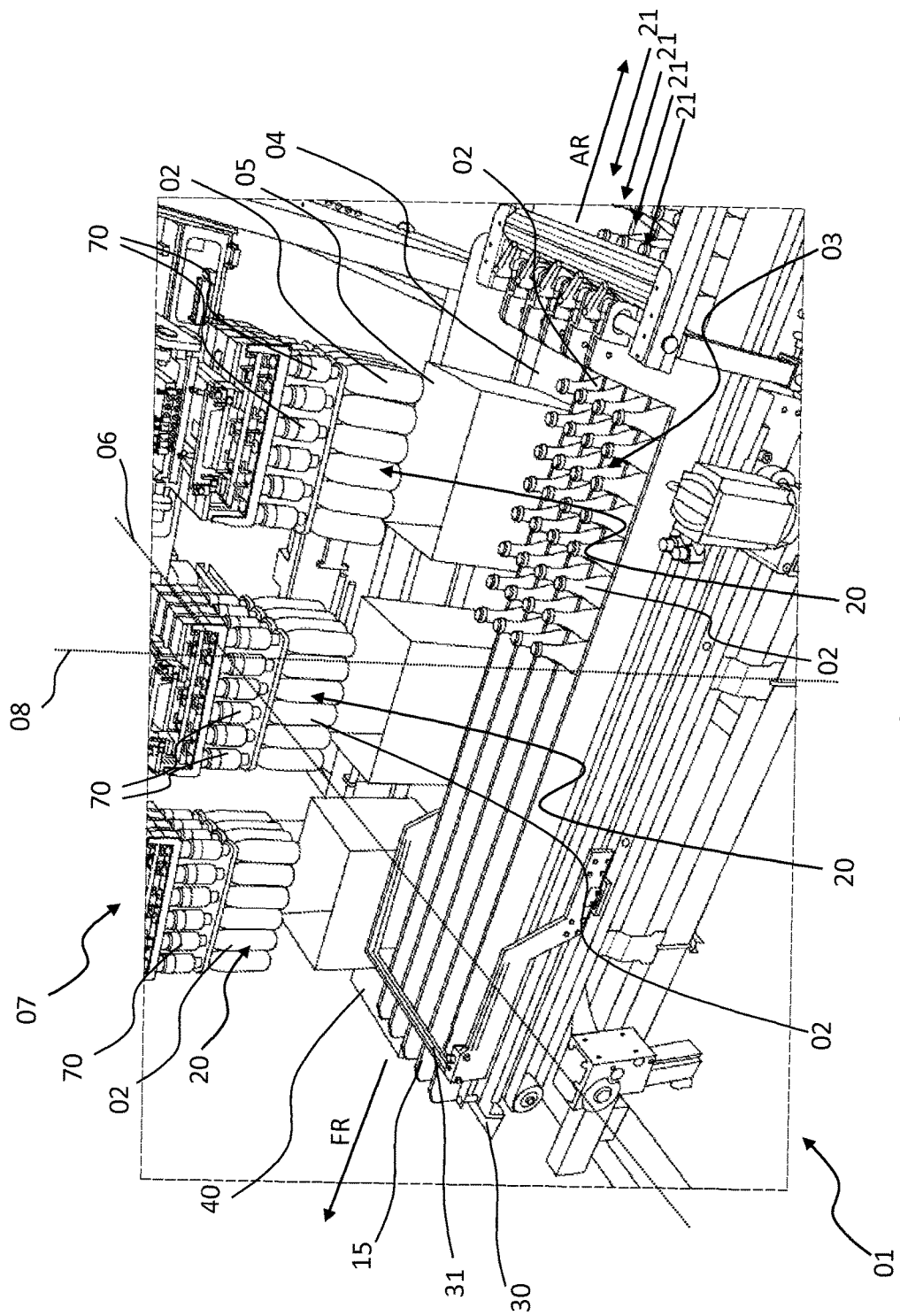
FIG. 5 shows a perspective view of a snapshot illustration temporally immediately following the snapshot illustration in FIG. 4.
Figure 6:
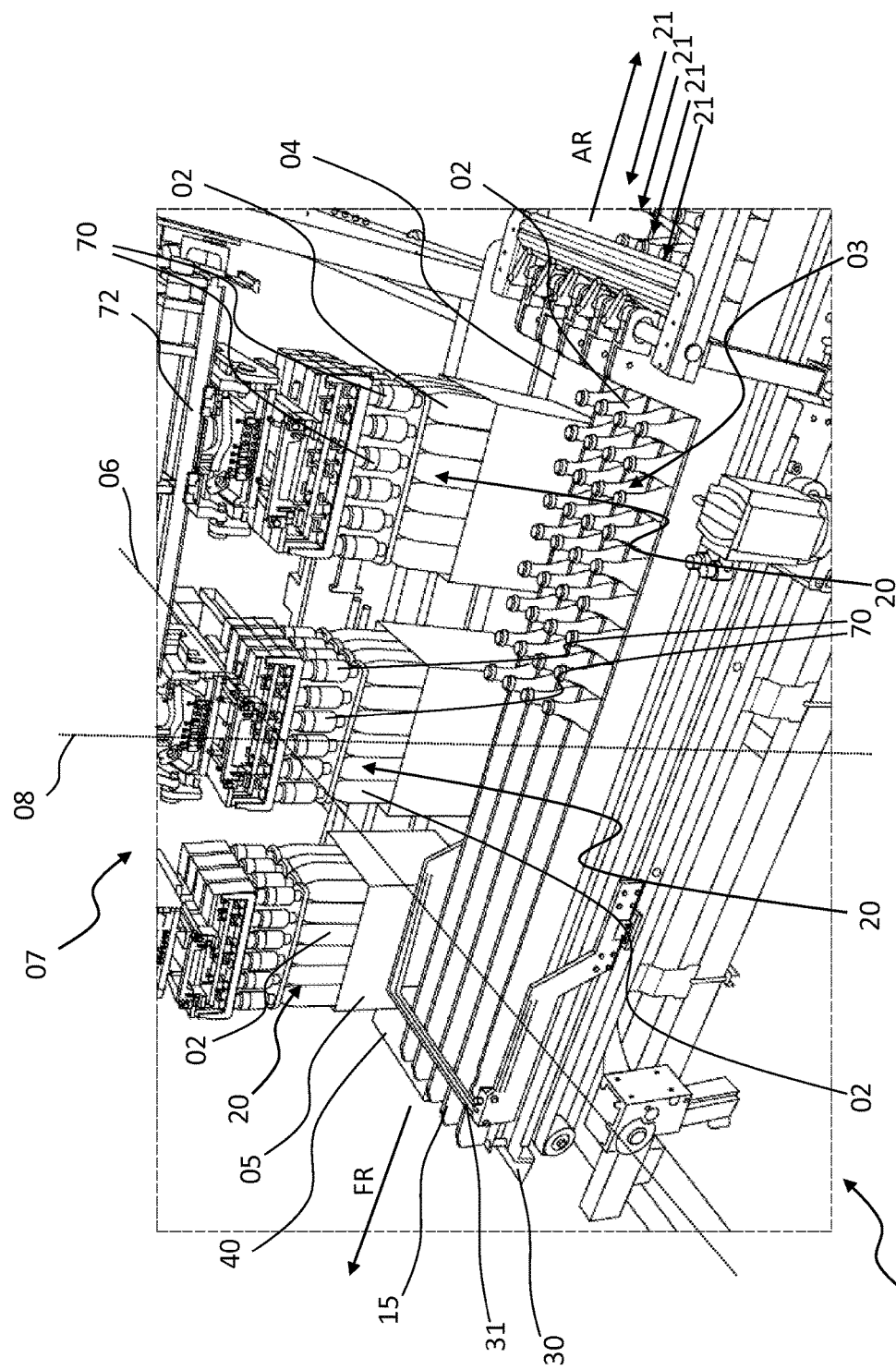
FIG. 6 shows a perspective view of a snapshot illustration temporally immediately following the snapshot illustration in FIG. 5.
Figure 7:
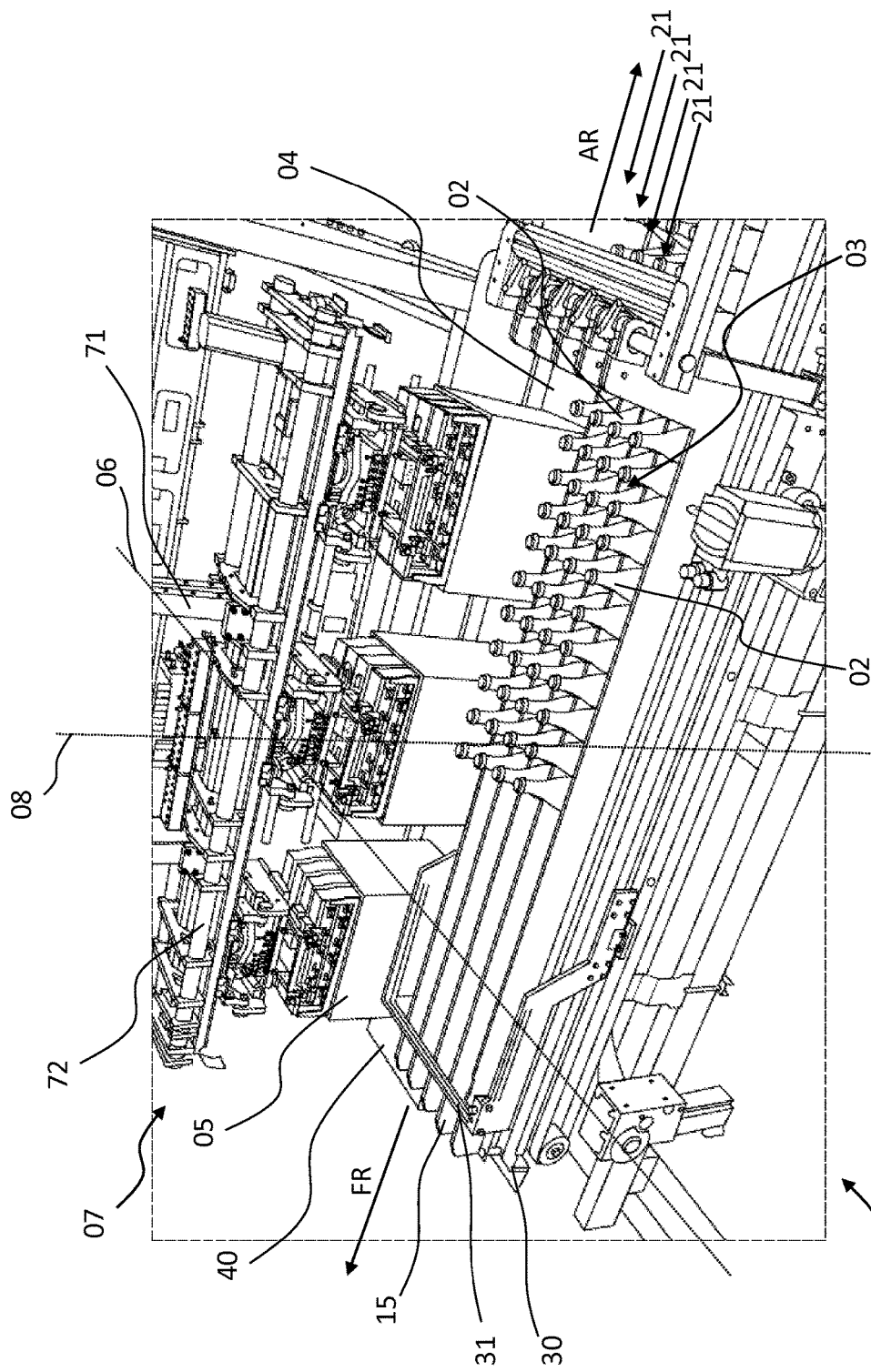
FIG. 7 shows a perspective view of a snapshot illustration temporally immediately following the snapshot illustration in FIG. 6.
Figure 8:
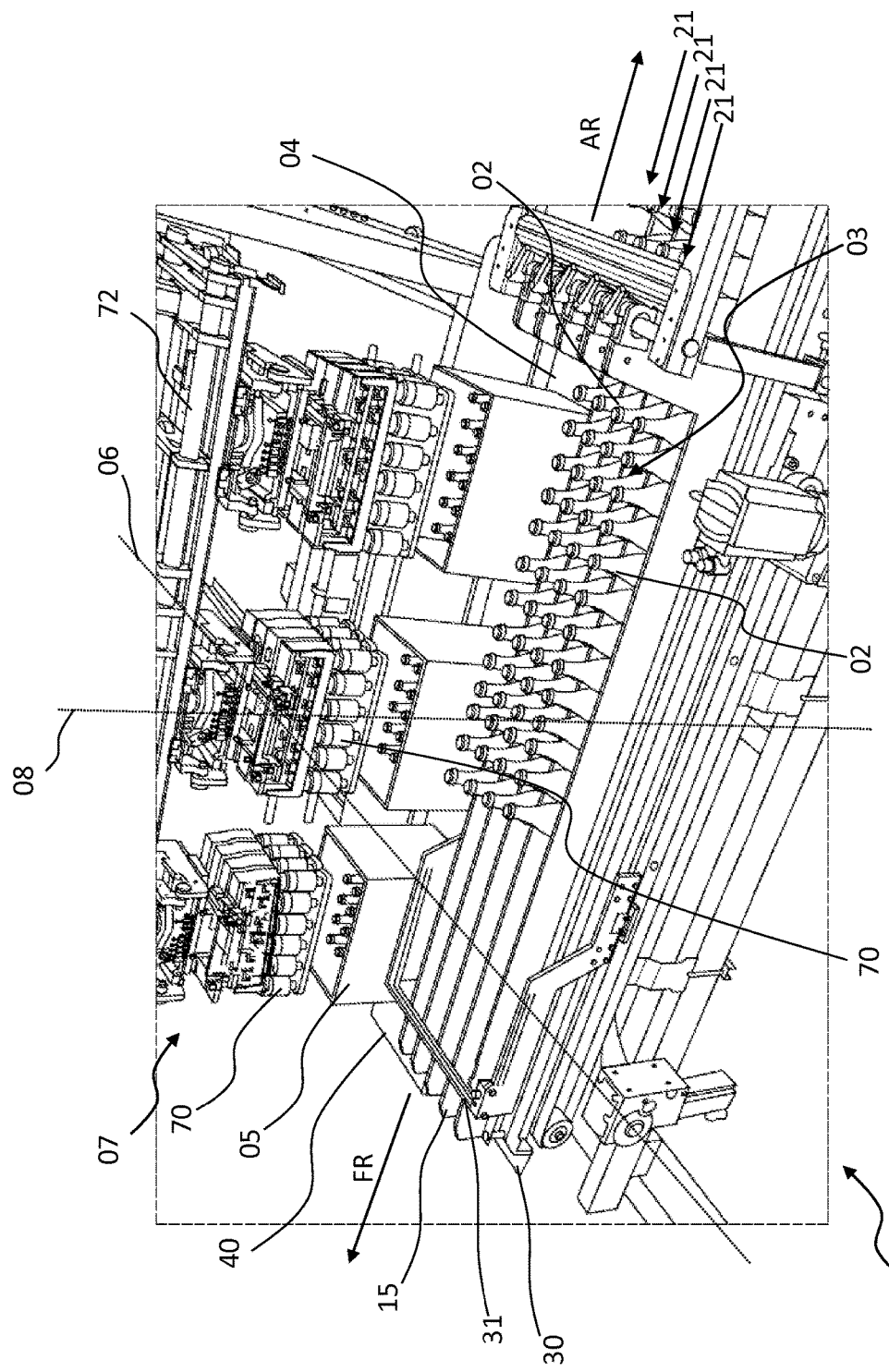
FIG. 8 shows a perspective view of a snapshot illustration temporally immediately following the snapshot illustration in FIG. 7.

The method finally provides to simultaneously lower, as is illustrated in temporal sequence in FIG. 5, FIG. 6, and FIG. 7, and release, as is illustrated in temporal sequence in FIG. 7 and FIG. 8, the articles 02 having been arranged corresponding to an arrangement to be produced prior to placing the articles 02 into the outer packagings 05, this arrangement being defined by one or more outer packagings 05 staged on the staging surface 04, into the one or more outer packagings 05 staged on the staging surface 04.

Figure 9:
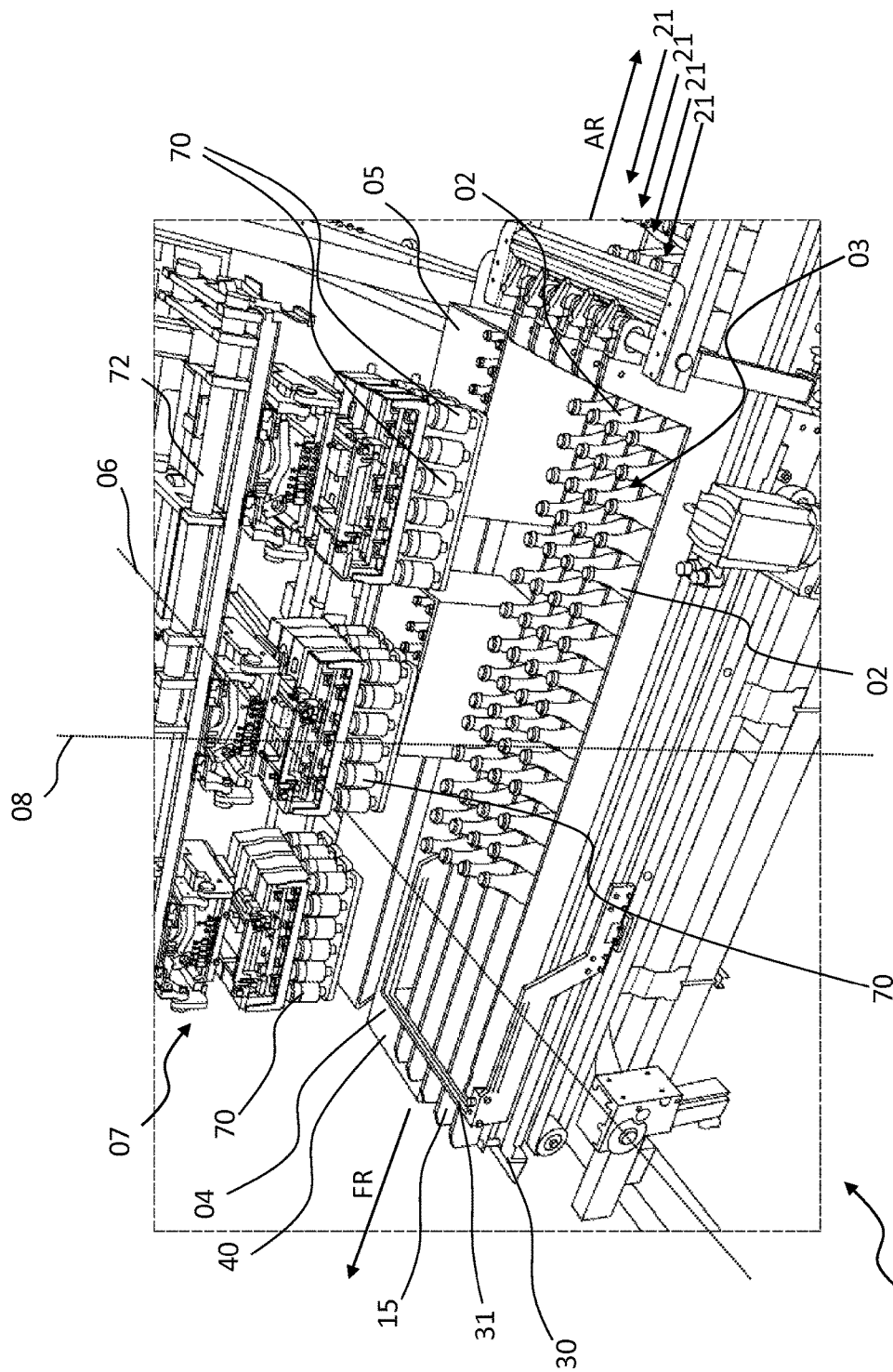
FIG. 9 shows a perspective view of a snapshot illustration temporally immediately following the snapshot illustration in FIG. 8.

Subsequent to this, the method can be repeated, beginning with the first process step, as is illustrated in temporal sequence in FIG. 8, FIG. 9, and FIG. 10, by means of a return movement of the manipulator head 72 with the gripper heads 70 of the apparatus 01 arranged thereat.

The infeed 03 can comprise articles 02 being transported by means of, for instance, one or more conveyor 30 continuously or discontinuously in a transport direction FR in, for instance, one or more article flows 21 of continuous, immediately consecutive articles 02 and/or articles 02 that are spaced apart from one another, for instance, articles 02 that are already grouped according to their number and/or already spaced apart from one another according to their later arrangement in an outer packaging 05.

The method can provide to also remove a plurality of articles 02 simultaneously from the infeed as seen transversely to the transport direction FR, for instance, from a plurality of rows running in parallel to each other in transport direction FR separated from each other, for instance, by lane separators 15 and respectively forming an own article flow 21 of articles 02 being transported uninterruptedly, continuously, immediately consecutively and/or articles 02 being transported spaced apart from one another.

The method can moreover provide that outer packagings 05, into which articles 02 have already been placed, are removed from the staging surface 04 and new, empty outer packagings 05 are staged on the staging surface 04, while the method steps:

simultaneous removal of the articles 02 from the infeed 03, as well as arrangement of the articles 02 corresponding to an arrangement to be produced prior to placing the articles 02 into the outer packagings 05, this arrangement being defined by one or more outer packagings 05 staged on the staging surface 04, while the articles 02 are simultaneously being lifted up and transferred from the infeed 03 to the staging surface 04, are being carried out as is illustrated in temporal sequence in FIG. 8, FIG. 9, FIG. 10, and FIG. 11.

The method can further provide that:

the articles 02 are arranged, after their removal from the infeed 03 while still being lifted up and transferred from the infeed 03 to a staging surface 04, individually or groupwise as seen in a direction transversely, for instance orthogonal to the transport direction FR, by an increase and/or decrease of individual distances between the articles 02 as seen transversely, for instance orthogonal to the transport direction FR, corresponding to an arrangement to be produced prior to placing the articles 02 into the outer packagings 05, for instance an arrangement corresponding to one or more groups 20, this arrangement being defined by one or more outer packaging 05 staged on the staging surface 04, and/or the articles 02 are aligned, while still being lifted up and transferred from the infeed 03 to a staging surface 04 after their removal from the infeed 03, by individual rotation of each article 02 about own rotational axes running in parallel to a vertical axis 08, and/or the articles 02 are aligned, while still being lifted up and transferred from the infeed 03 to a staging surface 04 after their removal from the infeed 03, by collective rotation of all lifted articles 02 or of groups 20 of articles 02 formed by all lifted articles 02 about one or more pivoting axes running in parallel to a vertical axis 08, and/or the articles 02 to be simultaneously transferred into one or more outer packagings 05 staged on the staging surface 04 are collectively removed from the infeed 03 during their movement in transport direction FR, and/or the effective actual positions of the articles 02 in the infeed 03 are detected for the removal of the articles 02 from the infeed 03, and that the removal of the articles 02 from the infeed 03 is carried out adapted to these actual positions.

Both the described apparatus 01 and the described method can alternatively or additionally have individual or a combination of a plurality of features initially described in connection with the prior art and/or in one or more documents mentioned regarding the prior art.

Moreover, the apparatus 01 can alternatively or additionally have individual or a combination of a plurality of features previously described in connection with the method, as well as the method can alternatively or additionally have individual or a combination of a plurality of features previously described in connection with the apparatus 01.

Figure 11:
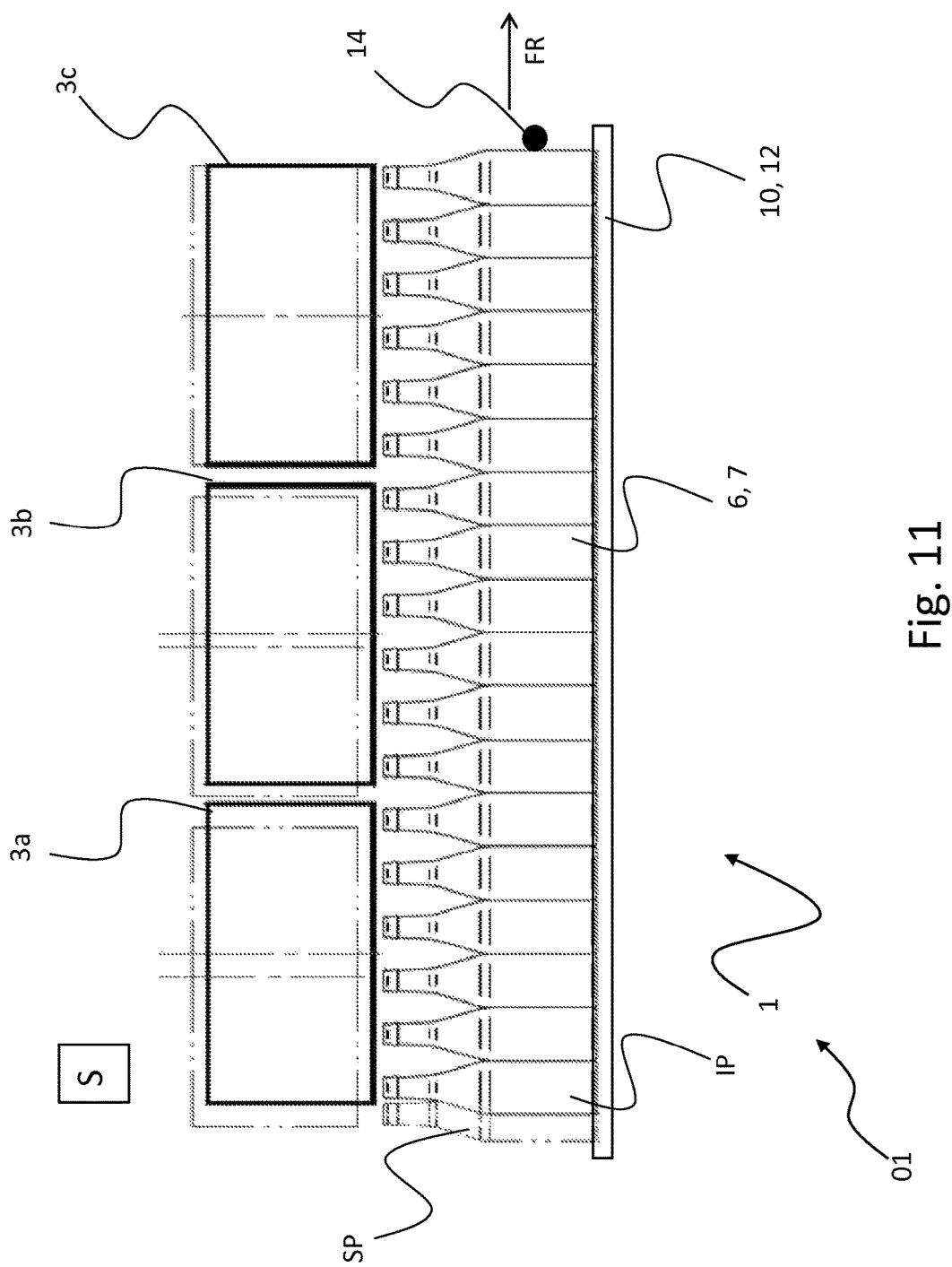
FIG. 11 shows a lateral view according to a further exemplary embodiment of an apparatus for the handling of articles, the apparatus forming a system for adapting the removal positions of the gripper heads to the actual positions of the articles in the infeed when removing at least a plurality of articles arriving consecutively in a transport direction from the infeed, which handling provides that a plurality of articles are simultaneously removed from an infeed and transferred into at least one outer packaging staged on a staging surface.
Figure 12:
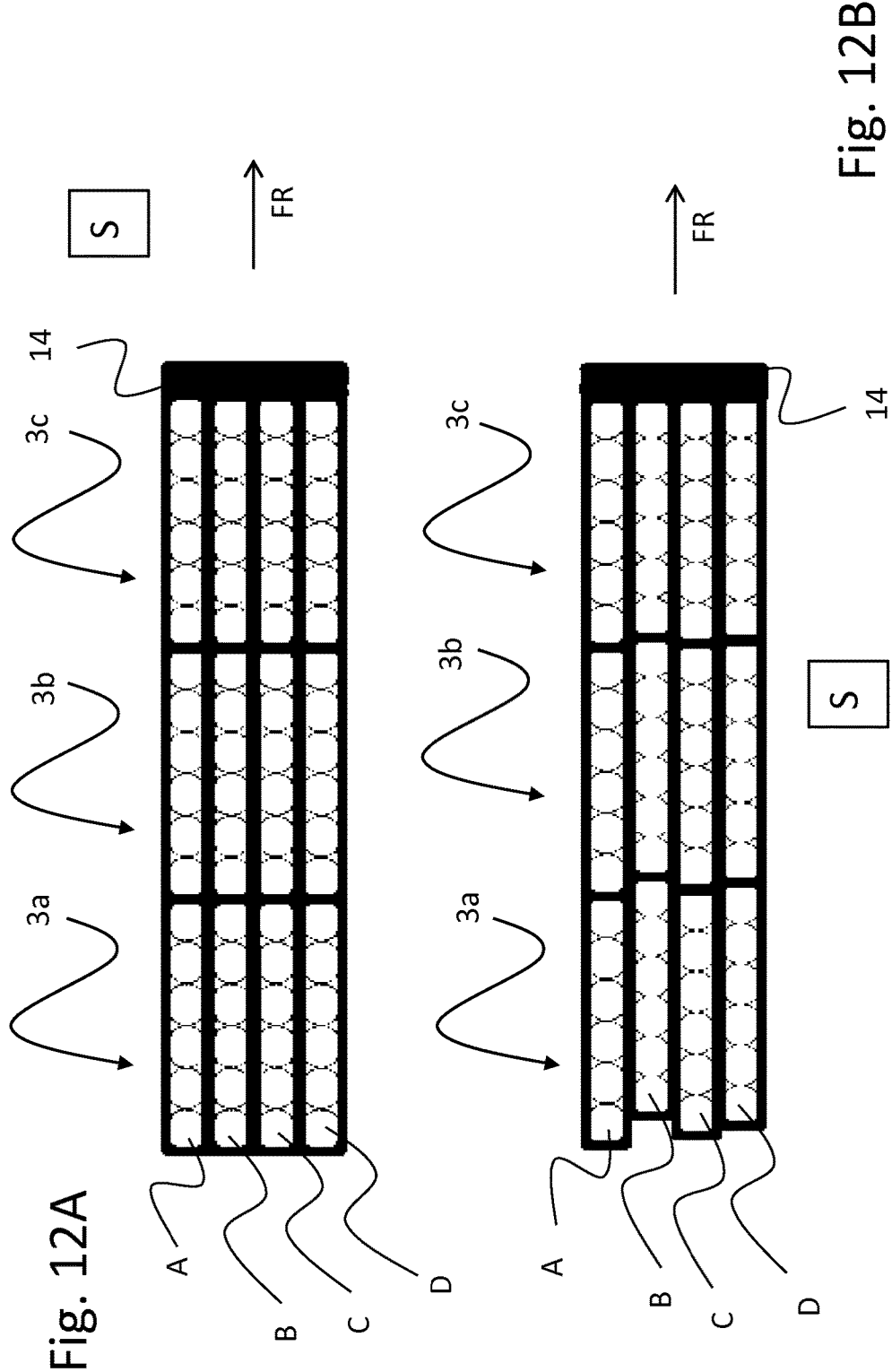
FIGS. 12A and 12B show a schematic diagram in a top view of an apparatus for the handling of articles, the apparatus forming a system for adapting the removal positions of the gripper heads to the actual positions of the articles in the infeed when removing at least a plurality of articles arriving consecutively in a transport direction from the infeed, which handling provides that a plurality of articles are simultaneously removed from an infeed and transferred into at least one outer packaging staged on a staging surface, in which removing the articles are seized and/or gripped, coming from above, and then lifted up.
Figure 13:
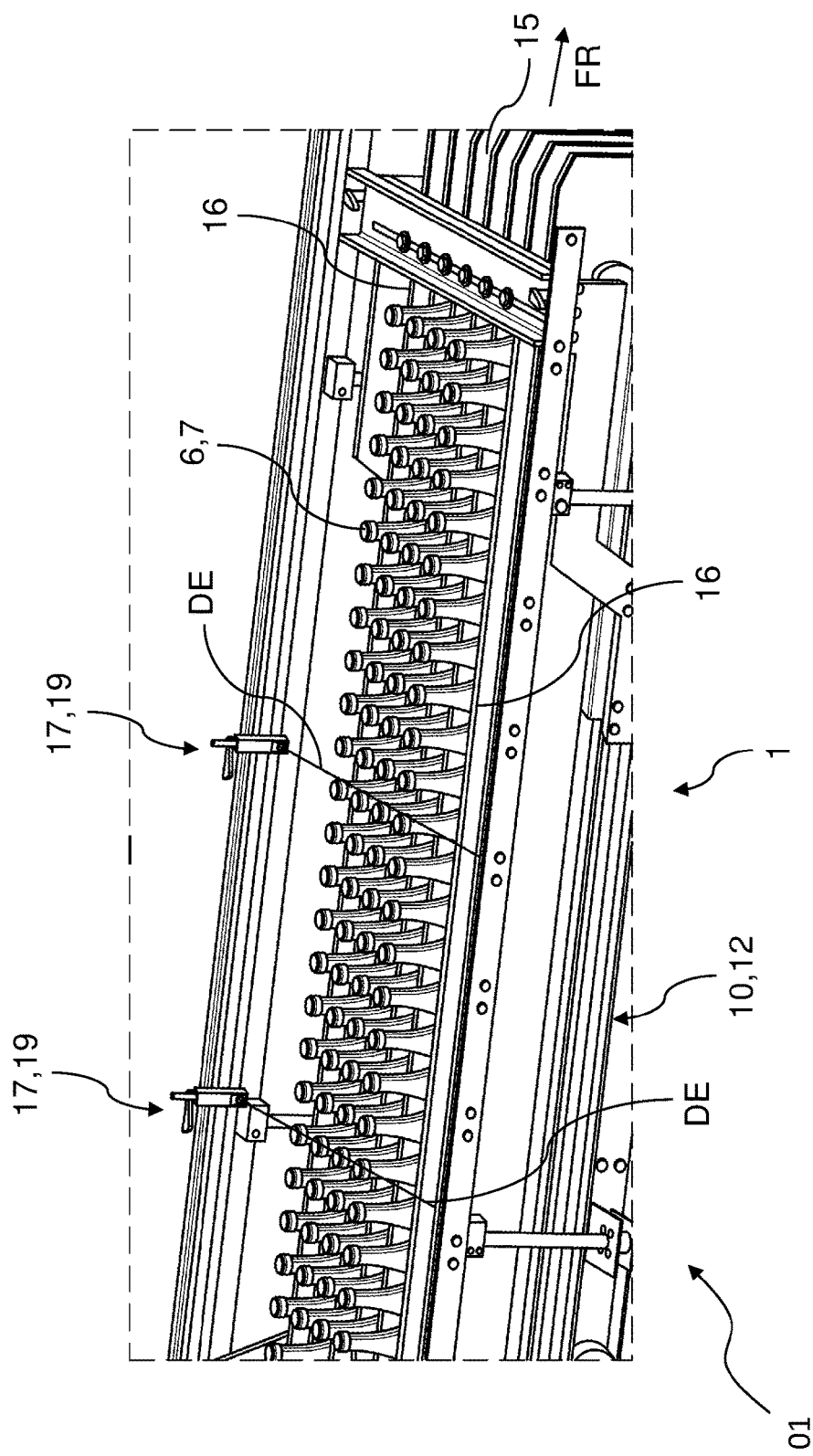
FIG. 13 shows a detailed view of an exemplary embodiment of detection means serving for detecting the actual positions of the articles in the infeed.
Figure 14:
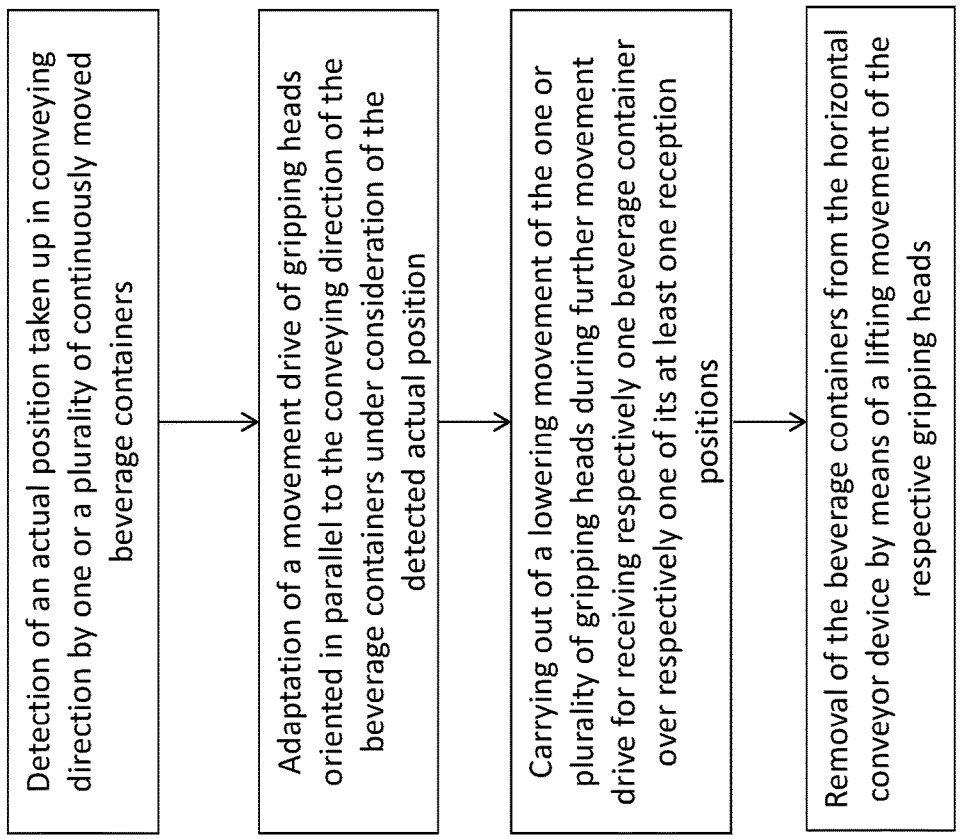
FIG. 14 shows a flowchart of a method for adapting the removal positions of the gripper heads of an apparatus for the handling of articles to the actual positions of the articles in the infeed when removing at least a plurality of articles arriving consecutively in a transport direction from the infeed, which handling provides that a plurality of articles are simultaneously removed from an infeed and transferred into at least one outer packaging staged on a staging surface.

It is important to emphasize that, in connection with a detection of the actual positions of the articles 02 of the infeed 03 arriving closely next to each other in transport direction FR, the apparatus 01 can form a system as illustrated entirely or in parts in FIG. 11 to 13, which system 1 is able to carry out a method as illustrated in its method steps in FIG. 14.

Such a system 1 can be provided, for instance, for discharging articles 02 formed as beverage containers 6, in the present instance formed by PET bottles 7 (PET: polyethylene terephthalate), from a horizontal conveyor device 10 forming an infeed 03. The beverage containers 6 or, as the case may be, the PET bottles 7, are moved along the horizontal conveyor device 10, for instance, in the form of an endless conveyor belt 12 in an uninterrupted and orderly mass flow.

In the lateral view of FIG. 11, only one of the parallely guided rows of beverage containers 6 respectively forming one article flow 21 can be discerned, however, a plurality of such rows are guided in parallel to each other by means of the endless conveyor belt 12 and are in this instance separated by lane separators 15 (cf. FIG. 13), which are also not discernible in FIG. 11. Indicated by means of an arrow illustration is a conveying direction for the beverage containers 6, which conveying direction forms the transport direction FR of the infeed 03 and which runs in parallel for all of the rows.

The endless conveyor belt 12 is continuously and uninterruptedly driven, with the beverage containers 6 being moved along the endless conveyor belt 12 at a continuously constant transport speed.

In the exemplary embodiment of FIG. 11, the system 1 comprises three gripper head groups 3a to 3c, consisting of respectively a plurality of gripper heads 70, one per each article 02 to be seized of the infeed 03, which gripper heads 70 are arranged consecutively in the transport direction FR of the beverage containers 6 or the PET bottles 7, as the case may be. The number of the gripper head groups 3a to 3c illustrated in FIG. 11 is to be understood merely exemplarily such that more than three gripper head groups 3a to 3c or also less than three gripper head groups 3a to 3c can be present in various further embodiments.

In addition, two detection means 17 arranged one after another in transport direction FR are provided, which are formed as light barriers 19. The detection means 17 or light barriers 19 were not illustrated in the schematic view of FIG. 11, however, the detection means 17 or light barriers 19 are exemplarily discernible with their possible arrangement along the horizontal conveyor device 12 in the exemplary embodiment of FIG. 13.

In the context of a movement drive, the gripper head groups 3a, 3b, and 3c move in parallel to the transport direction FR of the beverage containers 6 and along a longitudinal extension of the horizontal conveyor device 10 or of the endless conveyor belt 12, as the case may be. For this purpose, the gripper head groups 3a to 3c are brought into connection with a linear guidance arranged above the beverage containers 6. Before adaptation of their movement drive and reception of the beverage containers 6, the speed of the gripper head groups 3a to 3c is first formed to be speed synchronous to the movement of the drivable stop means 14, with which a beverage container 6 arranged respectively foremost of each row is in contact with. The speed of the stop means 14 is reduced in relation to the transport speed of the horizontal conveyor device 10. The stop means 14 also moves in the transport direction FR of the beverage containers 6 or the PET bottles 7, as the case may be.

For each row of beverage containers 6 being transported in parallel, each of the gripper head groups 3a to 3c has a plurality of receiving positions A, B, C, and D, as they are illustrated in FIG. 12 and described in more detail in the following.

In addition, a control unit S is schematically illustrated, which is brought into an operative connection with the gripper head groups 3a to 3c as well as with the detection means 17 or light barriers 19. Specifications on the respective desired position SP of beverage containers 6 are stored or saved on the control unit S, which desired positions SP the beverage containers 6 can take up in their transport by means of the horizontal conveyor device 12 over the course of time. Furthermore, a speed of the stop means 14, on which beverage containers 6 that are arranged foremost abut, is known to the control unit S.

In dependence on the desired positions SP over the course of time, the gripper head groups 3a to 3b are guided in transport direction FR along the horizontal conveyor device 12 and, in the course, initially have a speed in their movement drive which is formed to be identical with the speed of the stop means 14. The gripper head groups 3a to 3b are thus moved at least approximately speed synchronously with the beverage containers 6.

Since the beverage containers 6 are formed as PET containers 7, which tend toward dimensional instability, it can be that a deformation of one or more the beverage containers 6 results due to the dimensional instability and the pressurized surface contact of the beverage containers 6 abutting on each other. Due to the deformation, the effective actual position IP of one or more beverage containers 6 can deviate from an expected desired position SP. It is easily discernible in FIG. 11 that the actual position IP of the beverage containers 6 precedes the desired position SP in transport direction.

As mentioned, a beverage container 6 arranged foremost in each of the parallel rows abuts on a stop means 14, which stop means 14 has a speed that is reduced in relation to the transport speed of the horizontal conveyor device 10 or of the endless conveyor belt 12, as the case may be, and delays the transport of the beverage containers 6. The stop means 14 is oriented in perpendicular to the transport direction FR of the beverage containers 6 or the PET bottles 7, as the case may be. On the one hand, gaps in transport direction FR, which can be formed between successive beverage containers 6, as the case may be, are closed by the delay via the stop means 14. Furthermore, a delay leads to an increased pressurized surface contact of the beverage containers 6, which results in deformations of the beverage containers 6 with the already described deviation of the effective actual position from an expected desired position.

Since, according to experience in practice, a plurality of such deformations occur with a plurality of beverage container 6 in transport direction FR, the effective actual position of the beverage containers 6 increasingly deviates from an expected desired position with the distance increasing from the stop means 14.

A previous alignment or a previous adaptation of the movement drive of the gripper head groups 3a to 3c is necessary in order to be able to receive the beverage containers 6 during their continuous and uninterrupted movement by means of the horizontal conveyor device 10 or the endless conveyor belt 12, as the case may be.

In this context, the detection means 17 or the light barriers 19 transmit the effective actual position IP of the beverage containers 6 in transport direction FR to the control unit S. By means of the information on the effective actual position IP of the beverage containers 6, the control unit S is then able to adapt in real time the movement drive of the gripper head groups 3a to 3c to the effective actual position of the beverage containers 6 such that the beverage containers 6 can be received by the gripper head groups 3a to 3c without collision and with a high precision after adaptation. Since the actual position IP precedes the desired position, a correction offset in transport direction is necessary for the adaptation of the respective movement drive of the gripper head groups 3a to 3c.

In this context, all movement drives of all gripper head groups 3a to 3c are simultaneously adapted. The movement drive, which is formed identical to the speed of the stop means 14 prior to adaptation, is here accelerated or delayed for a short period such that the relative position of the gripper head groups 3a to 3c to the beverage containers 6 is changed by means of the acceleration or delay and the gripper head groups 3a to 3c have a changed relative position to the beverage containers 6 after adaptation of their movement drive or rather after the short-period acceleration or delay.

The relative position, in this context, is to be formed such that the receiving positions A, B, and C of the gripper head groups 3a to 3c are aligned to the beverage containers 6 for a reception of the beverage containers 6 after adaptation of the movement drive or rather after the short-period acceleration or delay. As already previously mentioned, the effective actual position of beverage containers 6 increasingly deviates from an expected desired position with the distance increasing from the stop means 14. A correction offset in or against the transport direction FR of the beverage containers 6 is therefore formed smaller in terms of amount for the preceding gripper head group 3c than a correction offset of the gripper head group 3b succeeding in transport direction FR. Furthermore, a correction offset in or against the transport direction FR of the beverage containers 6 is formed smaller in terms of amount for the gripper head group 3b than a correction offset of the gripper head group 3a succeeding the gripper head group 3b in transport direction.

Immediately after adaptation of the respective movement drives, the gripper head groups 3a to 3c can again be moved speed synchronously with the stop means 14 or with the beverage containers 6 during their further movement drive such that the relative position between the gripper head groups 3a to 3c and the respective beverage containers 6 or the PET bottles 7, as the case may be, is maintained and the gripper head groups 3a to 3c can receive the beverage containers 6 in their respective receiving positions A, B, and C without collision.

For this purpose, the gripper head groups 3a to 3c are simultaneously lowered in direction of the horizontal conveyor device 12 and moved with the beverage containers 6 while maintaining their relative position to the beverage containers 6 during the further movement drive.

Each receiving position A, B, and C of the gripper head groups 3a to 3c is assigned an own gripper head 70, for instance, an own tulip-shaped gripper, which, for the purpose of clarity, is not illustrated in FIG. 11. The gripper heads 70 are also brought into connection with the control unit S. For receiving the beverage containers 6 or the PET bottles 7, as the case may be, from the horizontal conveyor device 10, the gripper heads 70 can temporarily fasten the respective beverage containers 6 to the respective gripper head group 3a to 3c. A point of time for the fastening can be specified via the control unit S.

After the temporary fastening of the beverage containers 6 or PET bottles 7, as the case may be, to the respective gripper head group 3a to 3c has been carried out, the gripper head groups 3a to 3c are simultaneously lifted up in a direction away from the horizontal conveyor device 10 or from the endless conveyor belt 12, as the case may be. The speed of the gripper head groups 3a to 3c in this context continues to be formed identical to the speed of the stop means 14.

In particularly preferred embodiments, the gripping devices, which is in connection with the control unit S, can rotate, or rather rotatingly move the respectively received beverage containers 6 such that an identification mark, if applicable, for instance, a label, of the beverage containers 6 can be aligned while the beverage containers 6 are being discharged from the horizontal conveyor device 10 or the endless conveyor belt 12, as the case may be.

In practice it is possible to transport a multitude of different beverage containers 6, which differ in material type as well as in material thickness, by means of the horizontal conveyor device 10 or the endless conveyor belt 12, as the case may be. Accordingly, an initially great deviation of the expected desired position SP from the effective actual position IP can be associated with a change of beverage containers 6 to be transported and following beverage containers 6 to be discharged by the horizontal conveyor device 10. In order to counteract this problem, the system 1 can be designed as a system that is capable of learning, in which specifications on the respective beverage containers 6 to be transported by the horizontal conveyor device 10 are transmitted to the control unit S. If the control unit S detects a deviation, in particular a frequently recurring deviation, of the desired position to be expected from the effective actual position IP of beverage containers 6, it can store the effective actual positions IP and adapt the respective desired positions to be expected to the detected effective actual positions during ongoing operation. If the respective beverage containers 6 are to be transported by means of the horizontal conveyor 10 and discharged from the horizontal conveyor device 10 again at a later point in time, the control unit S can refer to the stored actual positions or to earlier empirical values, as the case may be.

From longer operation of the system 1, the effective actual position IP of the beverage containers 6 can then be increasingly accurately predicted via the control unit S such that an adaptation of a movement drive of the gripper head groups 3a to 3c is no longer necessary or only with a slight correction offset after a certain operation of the system 1.

A schematic top view onto an embodiment of a system 1 according to the invention by way of a clarification of the adaptation of a movement drive of a plurality of gripper head groups 3a to 3c is now shown in FIG. 12A and FIG. 12B.

Further discernible in FIG. 12A are thus the three gripper head groups 3a to 3c moving in transport direction FR of the beverage containers 6 in the context of their movement drive as well as the stop means 14, which is also being guided in transport direction FR. In FIG. 12A, the respective movement drive of the gripper head groups 3a to 3c has not yet been adapted to the respective detected actual position IP of beverage containers 6.

FIG. 12A in addition shows a plurality of receiving positions A, B, C, and D for each of the gripper head groups 3a to 3c. The first receiving positions A of the gripper head groups 3a, 3b, and 3c, which first receiving positions A are aligned in transport direction FR of the beverage containers 6, are provided for the reception of beverage containers 6 of a first of the parallel rows (cf. FIG. 13). Further, the second receiving positions B are provided for the reception of beverage containers 6 of a second of the parallel rows, the third receiving positions C for the reception of beverage containers 6 of a third row and the fourth receiving positions D for the reception of beverage containers 6 of a fourth row. Each of the gripper head groups 3a to 3c therefore has a plurality of receiving positions A, B, C, or D, respectively, for each of the parallel rows. The receiving positions A, B, C, and D are respectively formed by one gripper head 70 for respectively one beverage container 6 in this context.

In the exemplary embodiment of FIG. 12A, the receiving positions A, B, C, and D are at least approximately fixedly defined for the respective gripper head groups 3a to 3c. A relative movement of the first receiving positions A to one another as well as a relative movement of the first, second, third, and/or fourth receiving positions A, B, C, and D to one another is not possible in FIG. 12A.

Further, the total number of first, second, third, and fourth receiving positions A, B, C, and D of the first gripper head group 3a, the second gripper head group 3b as well as the third gripper head group 3c respectively corresponds to the number of beverage containers 6 intended for one packaging unit. By a reception of beverage containers 6 from the horizontal conveyor device 19 (cf. FIG. 11) and subsequent setting down, a packaging unit can thus be completely supplied with beverage containers 6 via one gripper head group 3a, 3b, or 3c.

In the embodiment shown in FIG. 12B, the actual position IP of beverage containers 6 has already been detected and the movement drive of the gripper head groups 3a to 3c has been adapted to the detected actual position IP. According to the exemplary embodiment of FIG. 12B, the first, second, third, and fourth receiving positions A, B, C, and D of the gripper head groups 3a to 3c were respectively adjusted relative to one another in this context. For the relative adjustment of the first, second, third, and fourth receiving positions A, B, C, and D, a correction offset of the gripper head groups 3a to 3c can be additionally or alternatively carried out in dependence on the respectively detected actual position IP, as has already been described for the exemplary embodiment of FIG. 11.

In FIG. 12B, the adjustment of the first receiving positions A of the gripper head groups 3a to 3c, of the second receiving positions B of the gripper head groups 3a to 3c, of the third receiving positions C of the gripper head groups 3a to 3c, and of the fourth receiving positions D of the gripper head groups 3a to 3c has been carried out respectively synchronously and at least approximately in real time after determining the respective actual position by means of the detection means 17.

As already previously mentioned, due to the dimensional instability of the beverage containers 6, a deviation of the effective actual position IP of beverage containers 6 from a desired position SP to be expected increases with the distance increasing from the stop means 14. Accordingly, the receiving positions A, B, C, and D of the gripper head group 3a, which has the greatest distance to the stop means 14, were adjusted by a greater amount than the receiving positions A, B, C, and D of the gripper head group 3b, which precedes the gripper head group 3a. Furthermore, the receiving positions A, B, C, and D of the gripper head group 3c, which precedes the gripper head group 3b, were adjusted by a smaller amount than the receiving positions A, B, C, and D of the gripper head group 3b. The adjustment of all of the receiving positions A, B, C, and D is carried out, if applicable, respectively in or against the transport direction FR of the beverage containers 6 or the PET bottles 7, as the case may be.

Moreover discernible in FIG. 13 is the guiding of the beverage containers 6 or the PET bottles 7, as the case may be, in parallel rows and in transport direction FR. For the purpose of clarity, the gripper head groups 3a to 3c from the previous FIG. 11 and FIG. 12 are not illustrated here.

FIG. 13 shows a plurality of lane separators 15 assigned to the horizontal conveyor device 10 or to the endless conveyor belt 12, as the case may be, which lane separators 15 guide the beverage containers 6 or the PET bottles 7, as the case may be, in parallel rows. For this purpose, the lane separators 15 are oriented in parallel to one another. Additionally illustrated are two side walls 16, which laterally limit the guiding of the beverage containers 6 along the horizontal conveyor device 10 and in transport direction FR. As is discernible in FIG. 13, the vertical extension of the lane separators 15 and the side walls 16 does not project beyond a neck of the beverage containers 6 formed as PET bottles 7 such that the PET bottles 7 remain accessible from above for the gripper head groups 3a to 3c.

Furthermore, the detection means 17 are illustrated, which have already previously been referred to. In the exemplary embodiment of FIG. 13, two detection means 17 are provided, which are consecutively arranged in transport direction FR of the beverage containers 6 in the area of the horizontal conveyor device 10. The detection means 17 are respectively formed as light barrier 19 and respectively have a detection area DE, which extends in perpendicular to the transport direction FR of the beverage containers 6.

FIG. 14 shows essential steps of an embodiment of a method 2 carried out by the previously described system 1.

In a first step, an actual position IP of one or more continuously moved beverage containers 6 is thus detected. In a following step, an adaptation of a movement drive of a plurality of gripper head groups 3a to 3c, which movement drive is oriented in parallel to the transport direction FR of the beverage containers 6, is carried out under consideration of the detected actual position IP. After the movement drive has been adapted, a lowering movement of the gripper head groups 3a to 3c is carried out over respectively one receiving position A, B, C, or D during the continued movement drive and for the reception of the beverage containers 6.

Finally, the beverage containers 6 are removed from the horizontal conveyor device 10 by means of a lifting movement of the gripper head groups 3a to 3c.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

1 System
2 Method
3a Gripper head group
3b Gripper head group
3c Gripper head group
6 Beverage container
7 PET bottle
01 Apparatus
02 Article
03 Infeed
04 Staging surface
05 Outer packaging
06 Horizontal axis
07 Gripping device
08 Vertical axis
10 Horizontal conveying device
12 Endless conveyor belt
14 Stop means
15 Lane separator
16 Side wall
17 Detection means
19 Light barrier
20 Group of articles 02 to be placed into an outer packaging 05
21 Article flow
30 Conveyor
31 End of the infeed 03
40 Conveyor
70 Gripper head
71 Manipulator
72 Manipulator head
AR Discharge direction of the staging surface 04
FR Transport direction of the infeed 03
ZR Infeed transport direction of the staging surface 04
A First receiving positions
B Second receiving positions
C Third receiving positions
D Fourth receiving positions
DE Detection area
IP Actual position
S Control unit
SP Desired position

The invention claimed is:

1. An apparatus (01) for the handling of articles (02), which handling provides to simultaneously remove a plurality of articles (02) from an infeed (03) and to transfer them into at least one outer packaging (05) staged on a staging surface (04), comprising:
an infeed (03) of articles (02) being transported in a transport direction (FR);
at least one staging surface (04) arranged next to the infeed (03) as seen in the direction of a horizontal axis (06), on which staging surface (04) one or more outer packagings (05) have been and/or are being staged, which the one or more outer packagings (05) are to be filled with articles (02) having been removed from the infeed (03), and from which staging surface (04) the one or more outer packagings (05) are discharged after the articles (02) have been placed therein;
a gripping device (07) for the simultaneous seizing of a plurality of articles (02) from the infeed (03), wherein the gripping device (07) has at least one manipulator (71) with a manipulator head (72) that is at least horizontally movable along a horizontal axis (06), and vertically movable along a vertical axis (08), with a plurality of gripper heads (70) arranged on the manipulator head (72) and with one gripper head (70) per article, and wherein the plurality of gripper heads (70) are individually and/or groupwise movable relative to each other in a first horizontal direction that is parallel to the transport direction (FR) and wherein the plurality of gripper heads (70) are individually and/or groupwise movable relative to each other in a second horizontal direction that is orthogonal to the transport direction (FR); and
a detection means (17) for detecting the actual positions of the articles (02) in the infeed (03).

2. The apparatus as recited in claim 1 wherein the plurality of gripper heads (70) are collectively movable in a first horizontal direction that is parallel to the transport direction (FR) of the infeed (03).

3. The apparatus as recited in claim 2 wherein the manipulator head (72) is additionally movable in the transport direction (FR) of the infeed.

4. The apparatus as recited in claim 3 wherein the detection means (17) comprises:
one or more imaging sensors; and
a control unit carrying out an image recognition algorithm, wherein control unit analyzes, in real time, an image of the articles (02) in the infeed (03) provided by the one or more imaging sensors with regard to the actual positions of the successively, as seen from the end (31) of the infeed (03) opposite the transport direction (FR) of the infeed (03), consecutively arriving and/or accumulated articles (02), and wherein the control unit produces control signals therefrom, which cause individual, translational movements in a direction in parallel to the transport direction (FR) of the individual gripper heads (70) at the manipulator head (72) in order to adapt the removal positions of the individual gripper heads (70) to the actual positions of the articles (02) in the infeed (03).

5. The apparatus as recited in claim 3 wherein the plurality of gripper heads (70) are individually, rotationally movable relative to each other about rotational axes parallel to the vertical axis (08).

6. The apparatus as recited in claim 3 wherein all of the plurality of gripper heads (70) are collectively pivotable about a pivoting axis parallel to the vertical axis (08).

7. The apparatus as recited in claim 3 wherein the staging surface (04) comprises at least one conveyor (40).

8. The apparatus as recited in claim 7 wherein the staging surface (04) is arranged next to an infeed conveyor and/or to a discharge conveyor or between an infeed conveyor and a discharge conveyor, wherein the one or more outer packagings (05) are pushed over onto the staging surface (04) and/or wherein the outer packagings (05), after the articles (02) have been placed therein on the staging surface (04), are pushed over for their discharge from the staging surface (04) onto a discharge conveyor.

9. The apparatus as recited in claim 8 wherein the infeed (03) comprises at least one conveyor (30).

10. The apparatus as recited in claim 3 wherein a subset of the plurality of gripper heads (70) are groupwise pivotable about one pivoting axis parallel to the vertical axis (08).

11. A method for the handling of articles (02), which handling provides to simultaneously remove a plurality of articles (02) from an infeed (03) and to transfer them into at least one outer packaging (05) staged on a staging surface (04), comprising:
removing a plurality of articles (02), arriving consecutively in a transport direction (FR), from the infeed (03) by seizing and/or gripping the plurality of articles from above, and then lifting the articles,
transferring the articles (02), while they are simultaneously being lifted up and collectively moving the articles from the infeed (03) toward the staging surface (04),
during the transferring step, arranging the articles (02), individually or groupwise, by increasing and/or decreasing individual distances between the articles (02) parallel to the transport direction (FR) and orthogonally to the transport direction (FR) to produce an arrangement (20) of articles (02) prior to placing the articles (02) into the outer packagings (05), this arrangement (20) being defined by the one or more outer packagings (05) staged on the staging surface (04), and placing the articles (02) into the outer packagings (05) by simultaneously lowering and releasing the articles (02) into the one or more outer packagings (05) staged on the staging surface (04).

12. The method as recited in claim 11 wherein a plurality of articles (02) is removed simultaneously from the infeed (03) as seen orthogonally to the transport direction (FR).

13. The method as recited in claim 12 further comprising removing the one or more outer packagings (05), into which articles (02) have already been placed from the staging surface (04) and staging one or more new, empty outer packagings (05) on the staging surface (04), while the removing and arranging steps are being carried out.

14. The method of claim 11 wherein, during the transferring step, rotating individual articles about individual rotational axes parallel to a vertical axis (08).

15. The method of claim 11 wherein, during the transferring step, aligning the articles (02) by collectively rotating all the articles or groups of articles about one or more pivoting axes parallel to a vertical axis (08).

16. The method of claim 11 wherein the removing step comprises simultaneously removing all of the articles (02) from the infeed (03).

17. The method of claim 11 further comprising detecting the actual positions of the articles (02) in the infeed (03) prior to the removing step.

18. An apparatus (01) for the handling of articles (02), which handling provides to simultaneously remove a plurality of articles (02) from an infeed (03) and to transfer them into at least one outer packaging (05) staged on a staging surface (04), comprising:
an infeed (03) of articles (02) being transported in a transport direction (FR);
at least one staging surface (04) arranged next to the infeed (03) as seen in the direction of a horizontal axis (06), on which staging surface (04) one or more outer packagings (05) have been and/or are being staged, which the one or more outer packagings (05) are to be filled with articles (02) having been removed from the infeed (03), and from which staging surface (04) the one or more outer packagings (05) are discharged after the articles (02) have been placed therein;
a gripping device (07) for the simultaneous seizing of a plurality of articles (02) from the infeed (03), wherein the gripping device (07) has at least one manipulator (71) with a manipulator head (72) that is at least horizontally movable along a horizontal axis (06), and vertically movable along a vertical axis (08), with a plurality of gripper heads (70) arranged on the manipulator head (72) and with one gripper head (70) per article, and wherein the plurality of gripper heads (70) are individually and/or groupwise movable relative to each other in a first horizontal direction that is parallel to the transport direction (FR) of the infeed (03) and wherein the plurality of gripper heads (70) are individually and/or groupwise movable relative to each other in a second horizontal direction orthogonal to the transport direction (FR) of the infeed (03).

19. The apparatus of claim 18 further comprising a detection means (17) for detecting the actual positions of the articles (02) in the infeed (03).

* * * * *